US006540382B1

(12) United States Patent
Simon

(10) Patent No.: US 6,540,382 B1
(45) Date of Patent: Apr. 1, 2003

(54) COLLIMATED LIGHT SOURCE WAVE ELEMENT FOR LIGHT SHAPING

(76) Inventor: Jerome H. Simon, 70 Sumner St., Newton Center, MA (US) 02159

( * ) Notice: Subject to any disclaimer, the term of this patent is extended or adjusted under 35 U.S.C. 154(b) by 0 days.

(21) Appl. No.: 09/451,068

(22) Filed: Nov. 30, 1999

Related U.S. Application Data

(63) Continuation-in-part of application No. PCT/US98/11382, filed on Jun. 3, 1998.
(60) Provisional application No. 60/048,514, filed on Jun. 4, 1997.

(51) Int. Cl.[7] ................................................. F21V 5/02
(52) U.S. Cl. ........................ 362/339; 362/317; 362/335; 362/337
(58) Field of Search ......................... 362/31, 551, 559, 362/576, 558, 554, 560, 335, 145, 146, 147, 148, 150–152, 317, 326–28, 330–334, 337, 339

(56) References Cited

U.S. PATENT DOCUMENTS

| 1,377,184 A | | 5/1921 | Comstock |
| 1,827,963 A | | 10/1931 | Wompey |
| 215,305 A | | 7/1939 | Ruths |
| 4,152,752 A | * | 5/1979 | Niemi ......................... 362/576 |
| 4,345,303 A | | 8/1982 | Gerad |
| 4,984,144 A | | 1/1991 | Cobb, Jr. et al. |
| 5,040,878 A | * | 8/1991 | Eichenlaub .................. 350/345 |
| 5,588,743 A | | 12/1996 | Mayo et al. |

* cited by examiner

*Primary Examiner*—Sandra O'Shea
*Assistant Examiner*—Ismael Negron
(74) *Attorney, Agent, or Firm*—Perkins, Smith & Cohen; Harvey Kaye; Jerry Cohen

(57) ABSTRACT

A lighting assembly which includes light source means and collimating means for substantially collimating the light from the source. There are transmission means for transmitting the substantially collimated light to a point remote from the collimating means, and, in one arrangement, having an upper section which allows transmission of light therethrough and a lower section which reflects light. Light direction modifying means such as a lens or a reflector is located in the transmission means and remote from the collimating means for receiving light from the collimating means and modifying the direction of the light to pass outside of the transmission means through the light-transmitting section. The light direction modifying means includes a large plurality of prisms on the outer surface thereof. The prisms may be arranged so that the radii of several adjacent ones substantially meet at a point, thereby to form a "wave" lens.

59 Claims, 22 Drawing Sheets

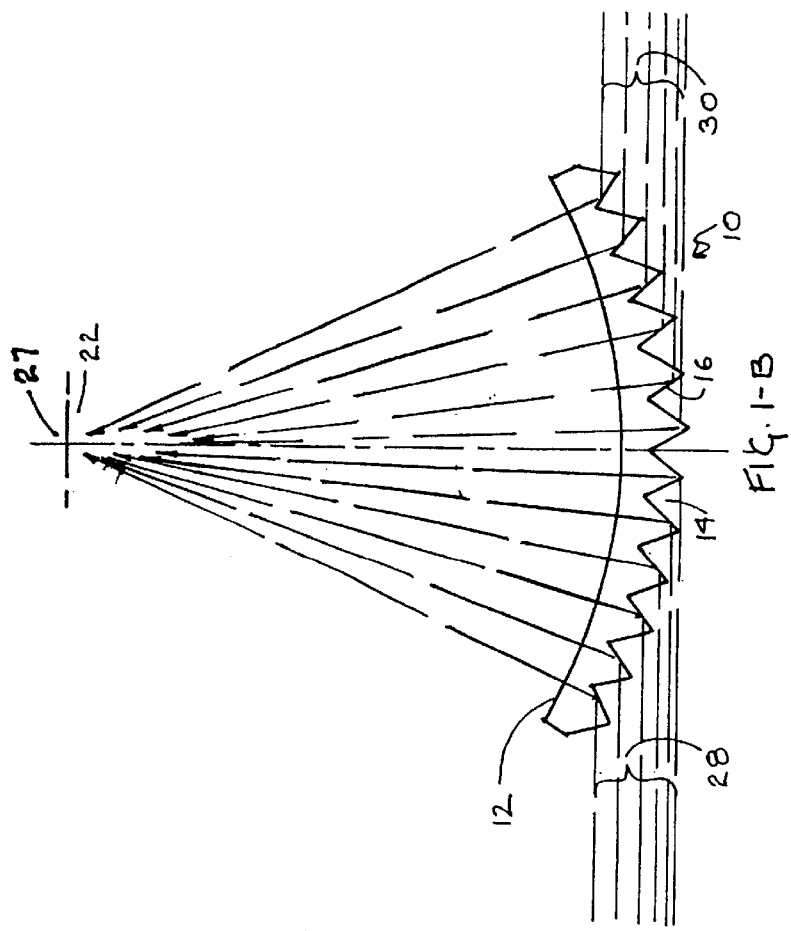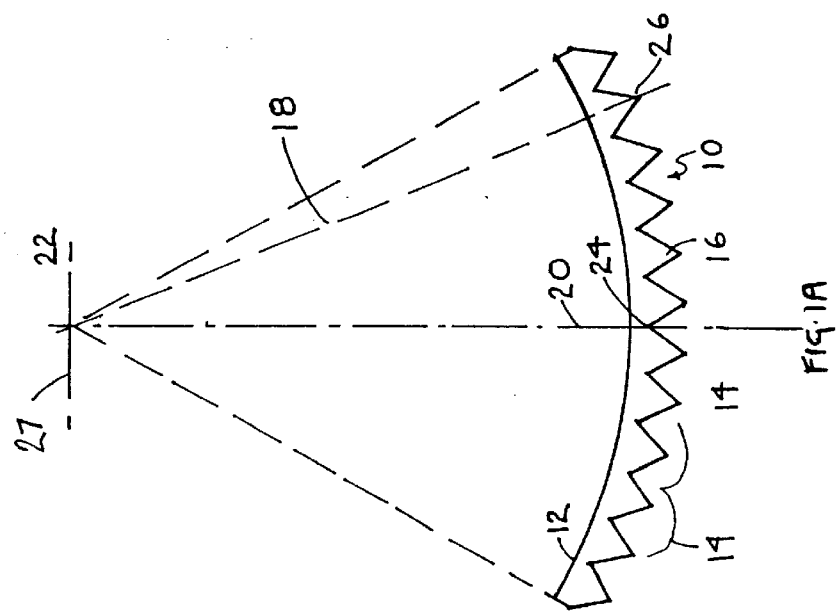

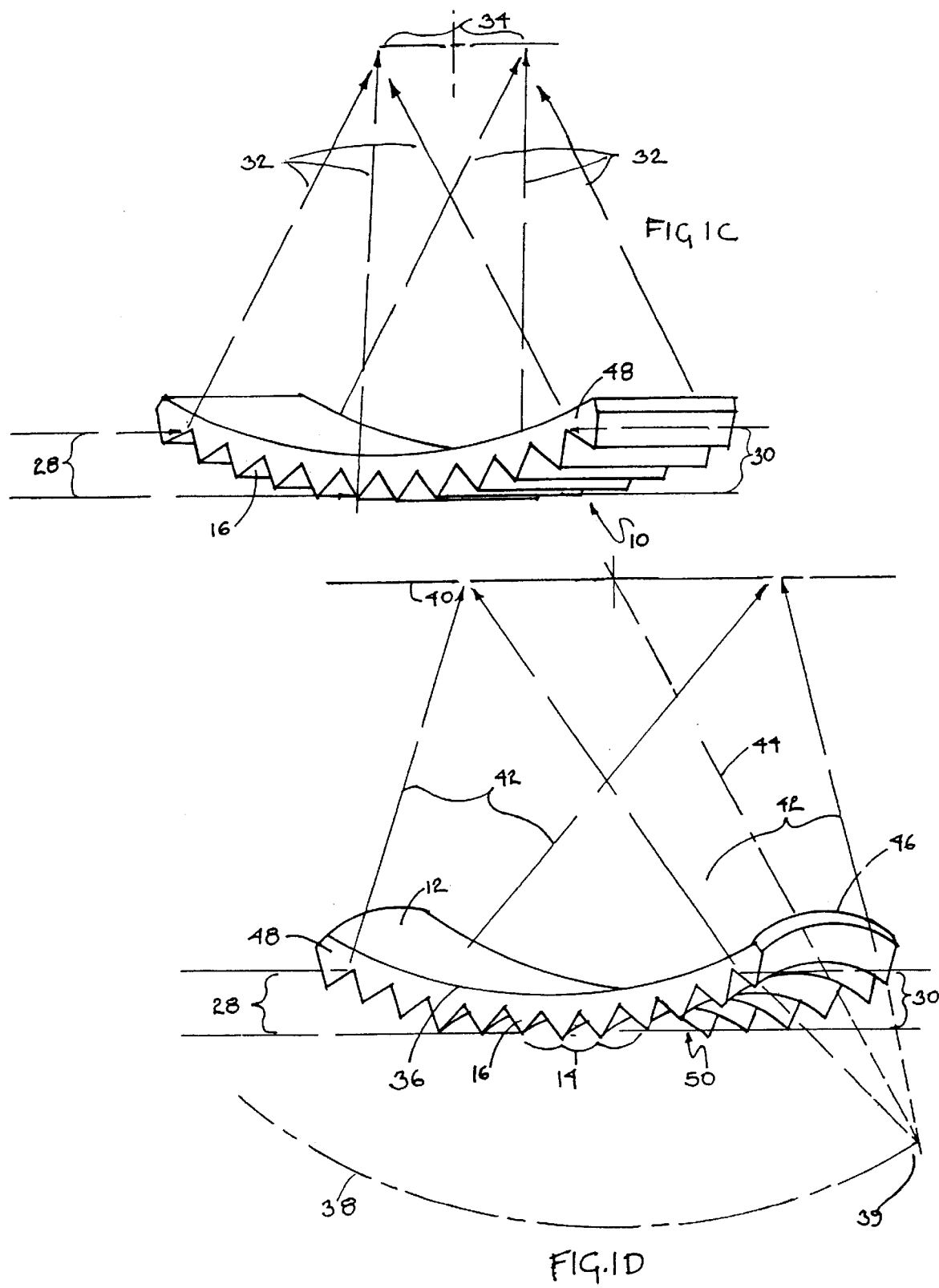

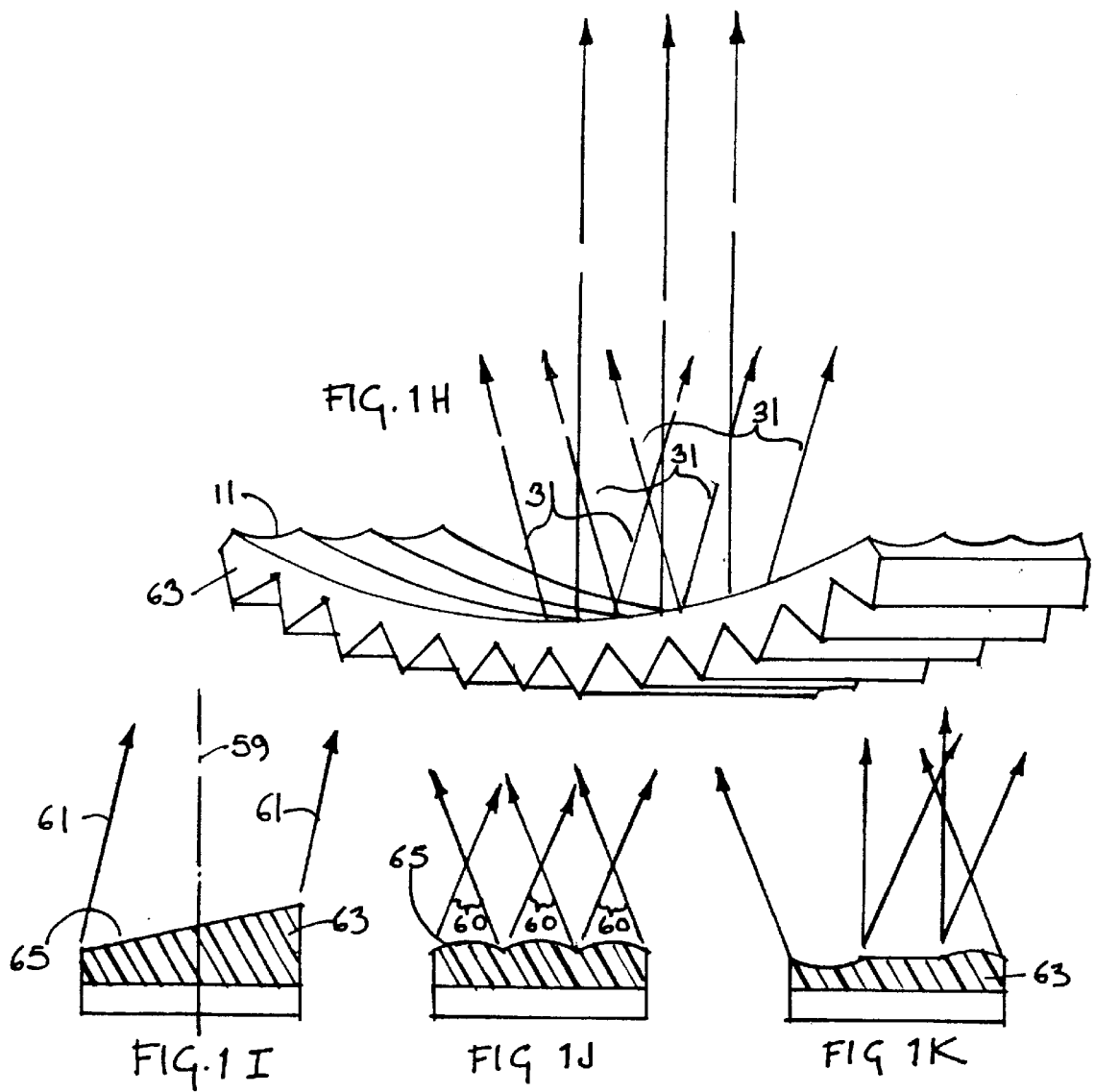

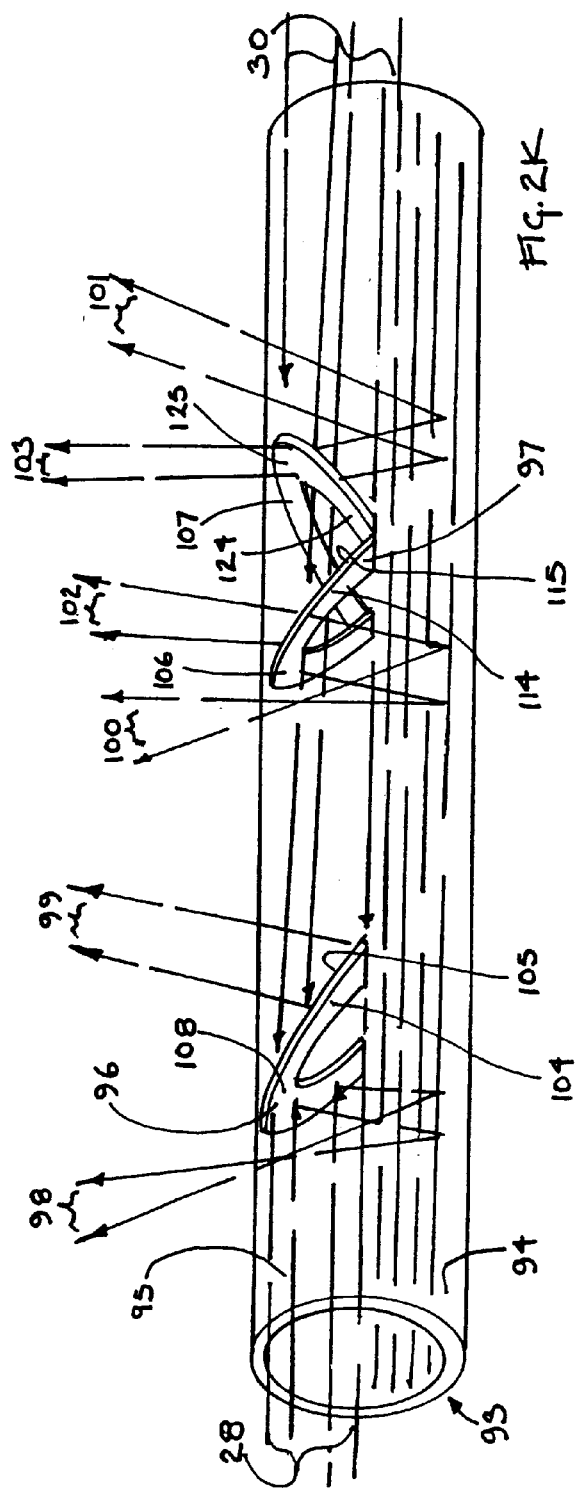
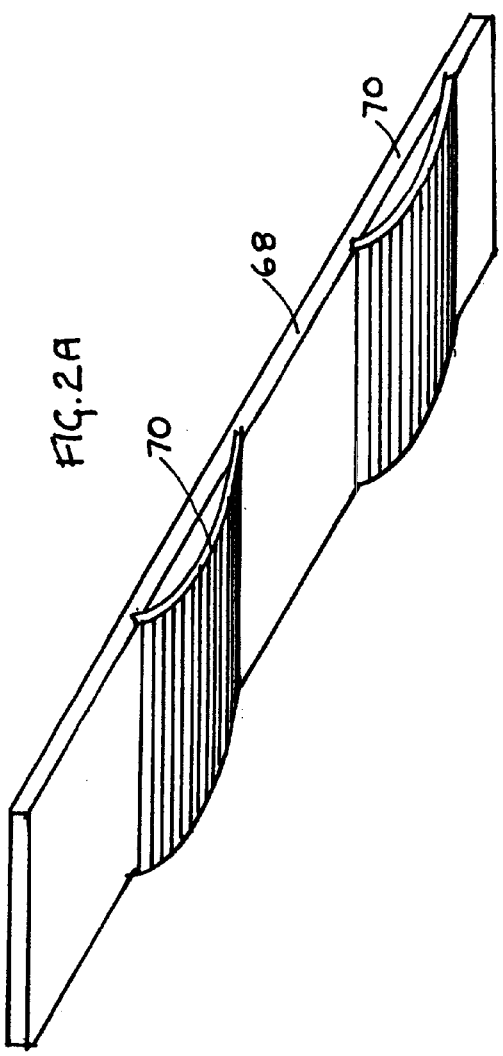

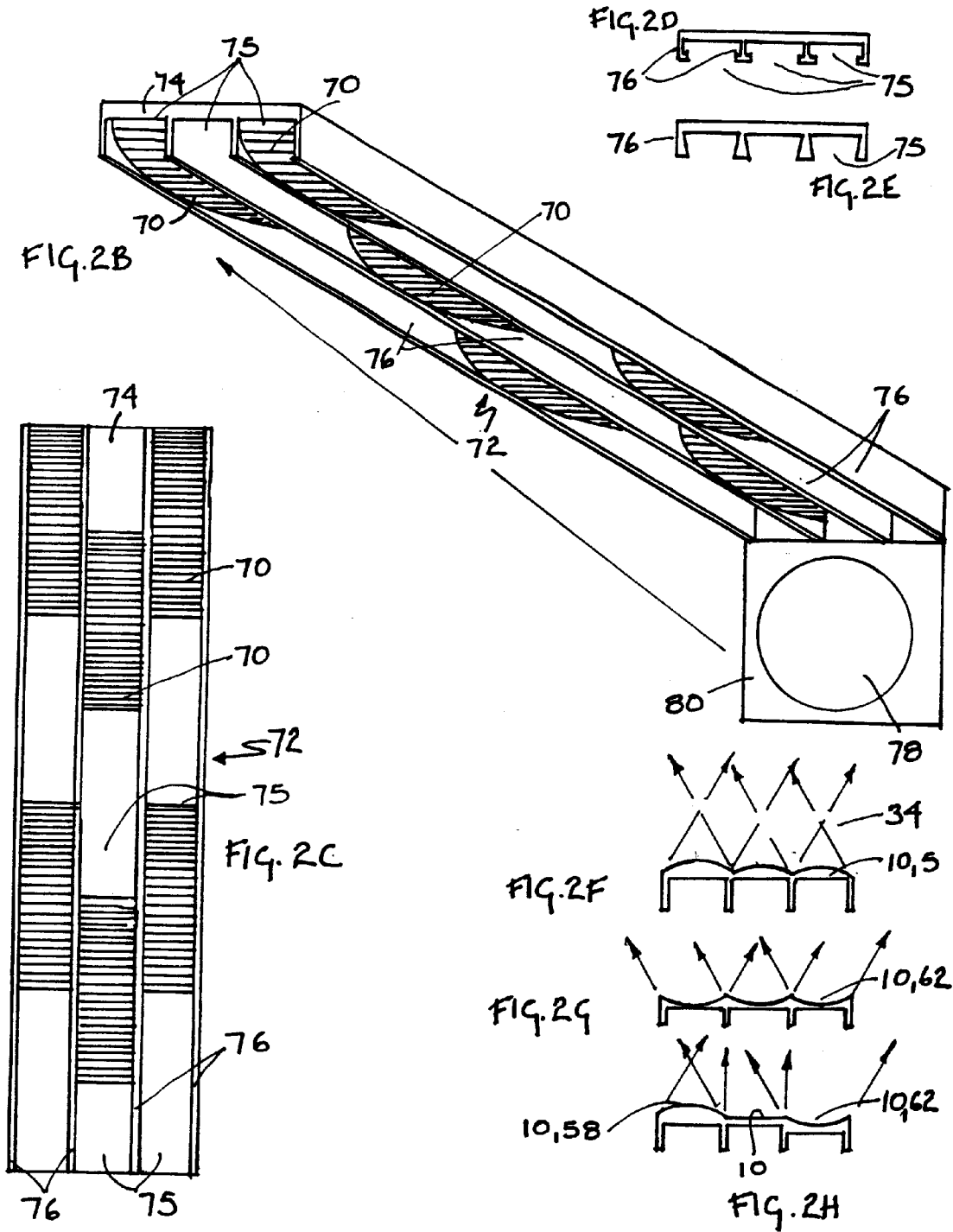

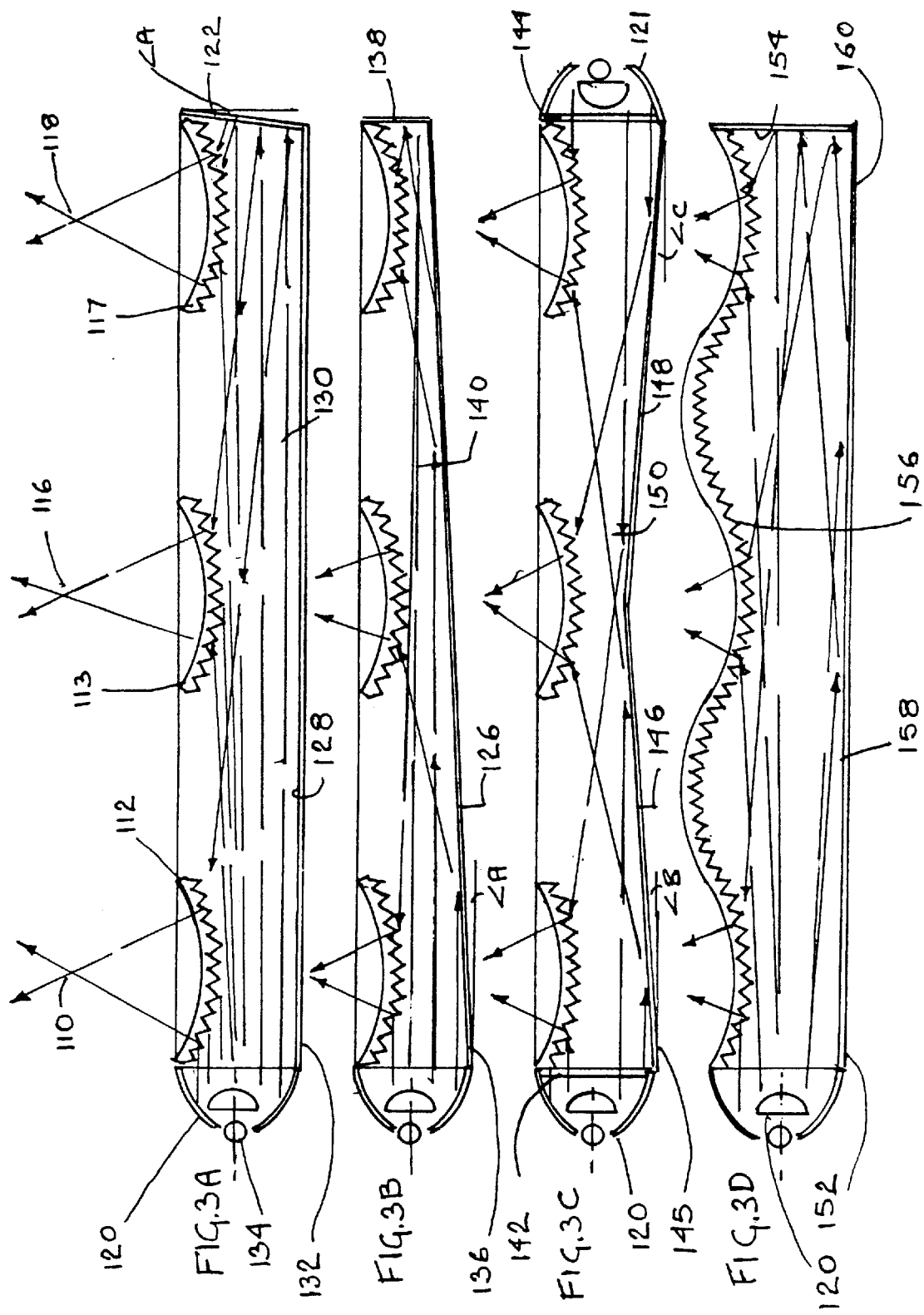

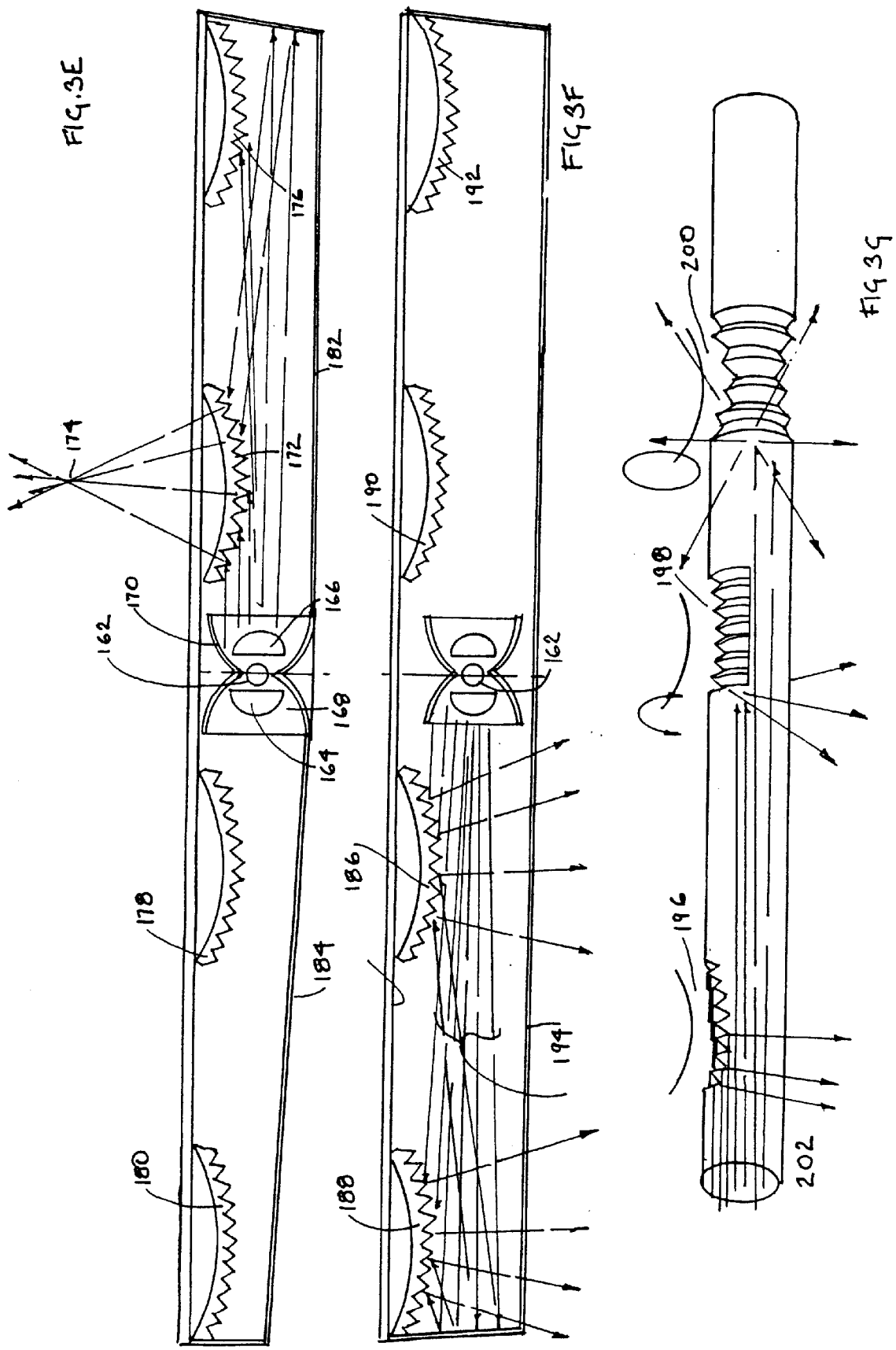

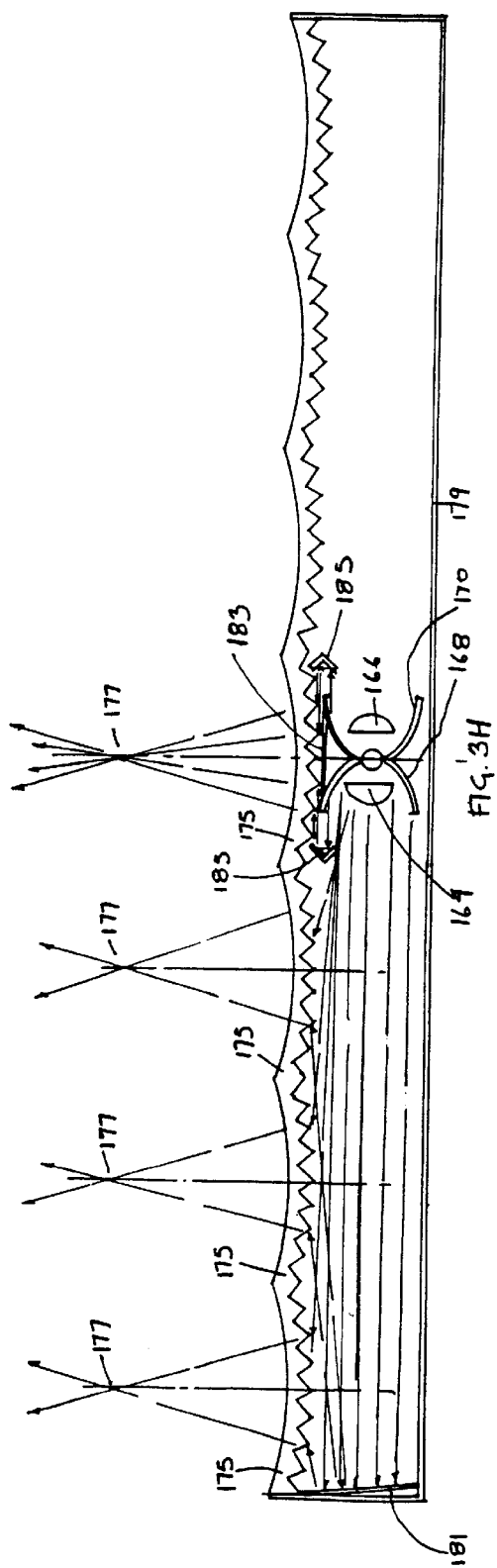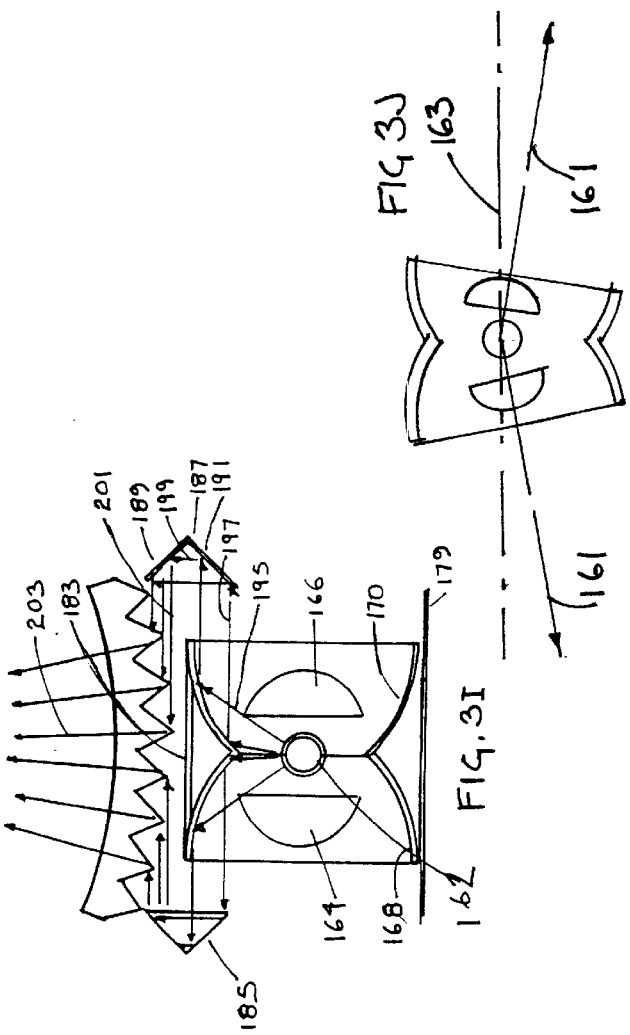

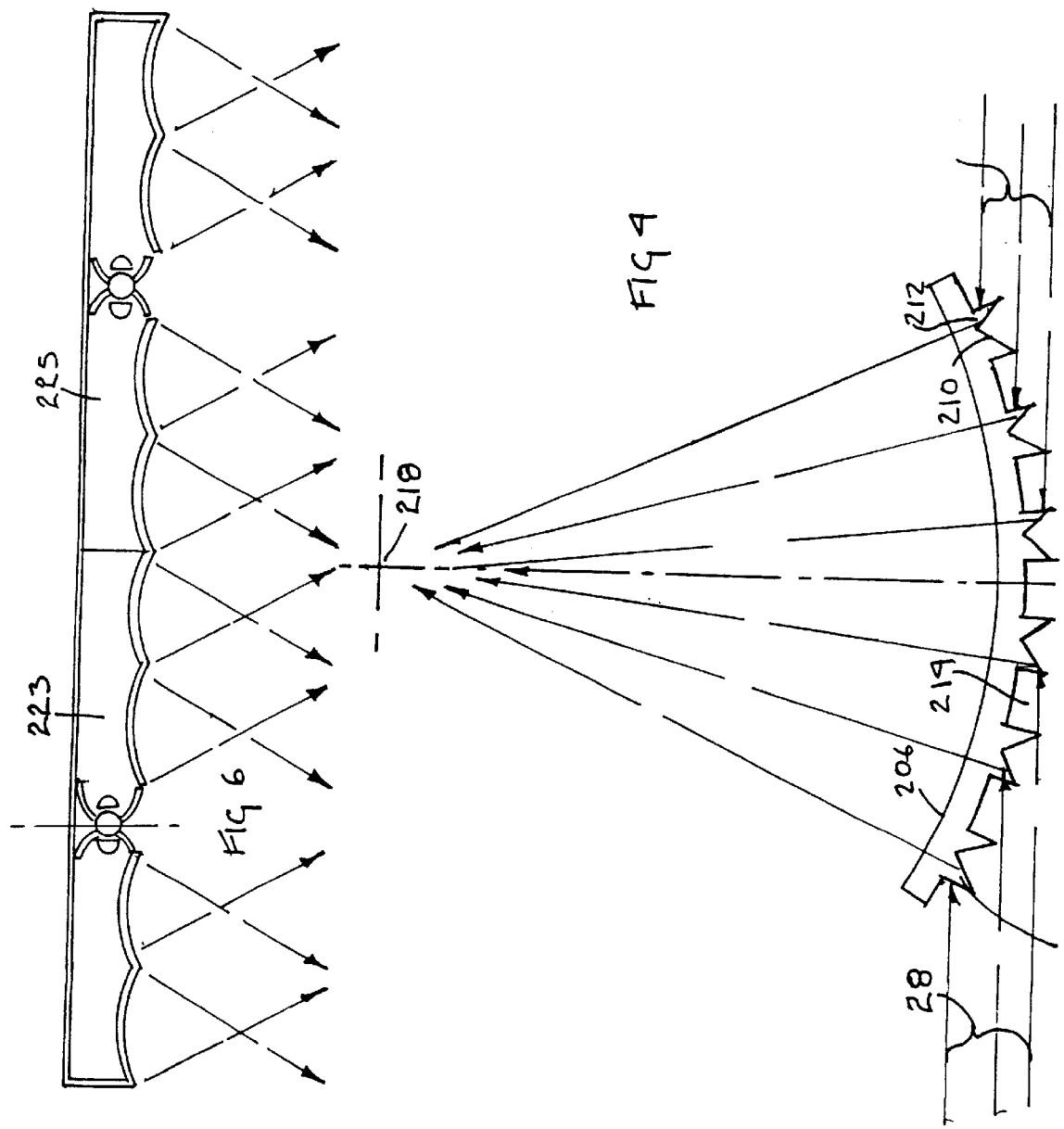

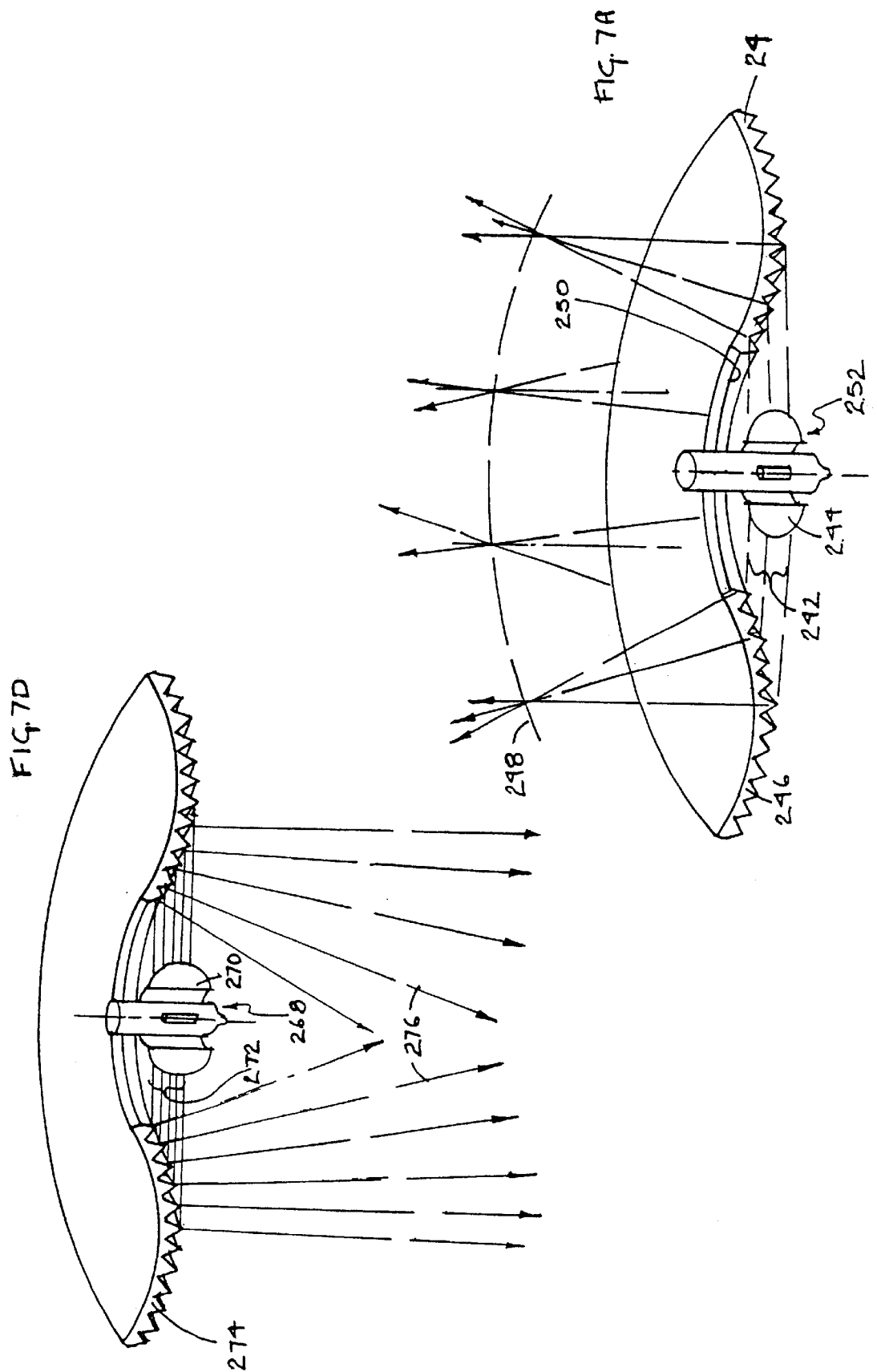

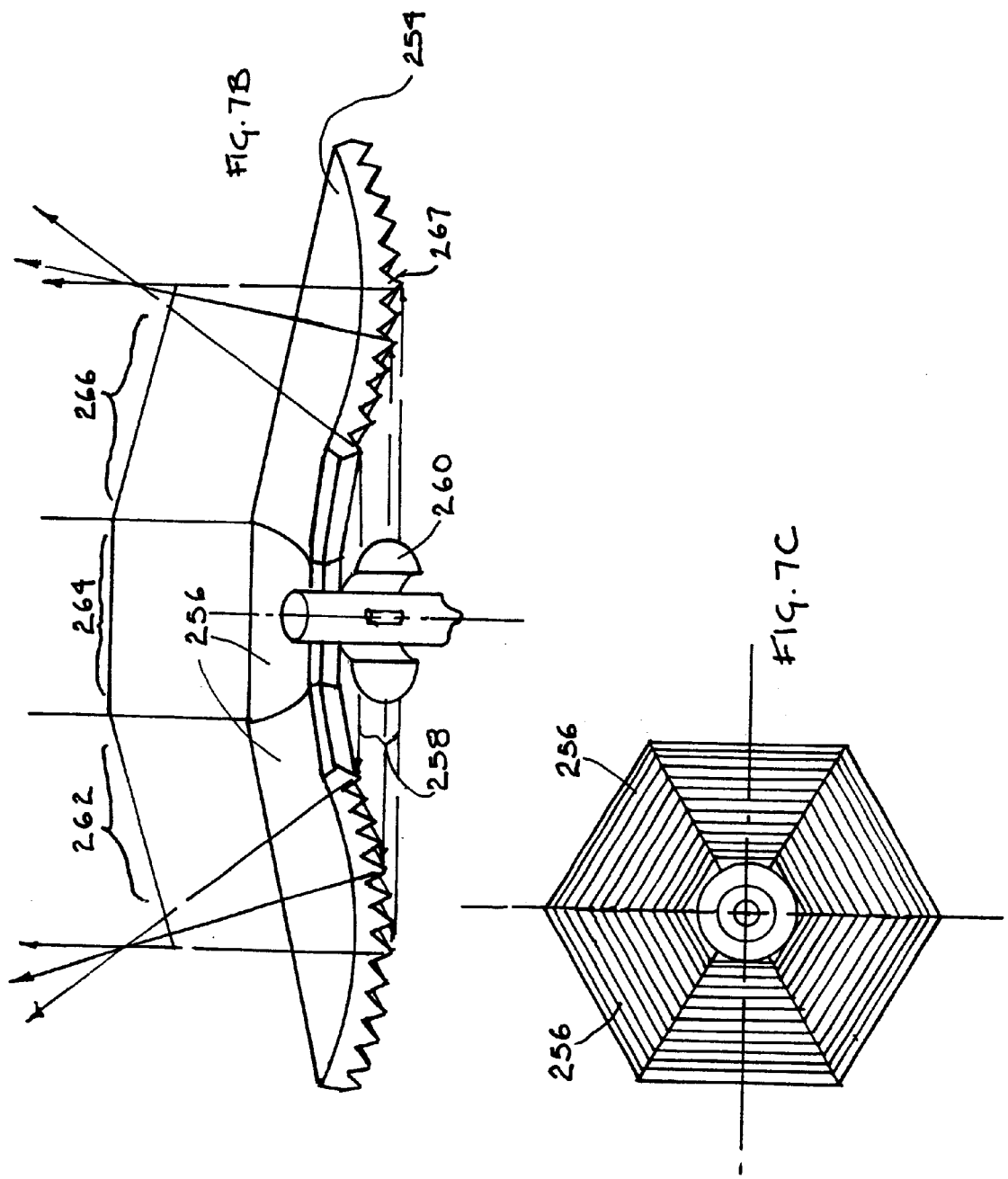

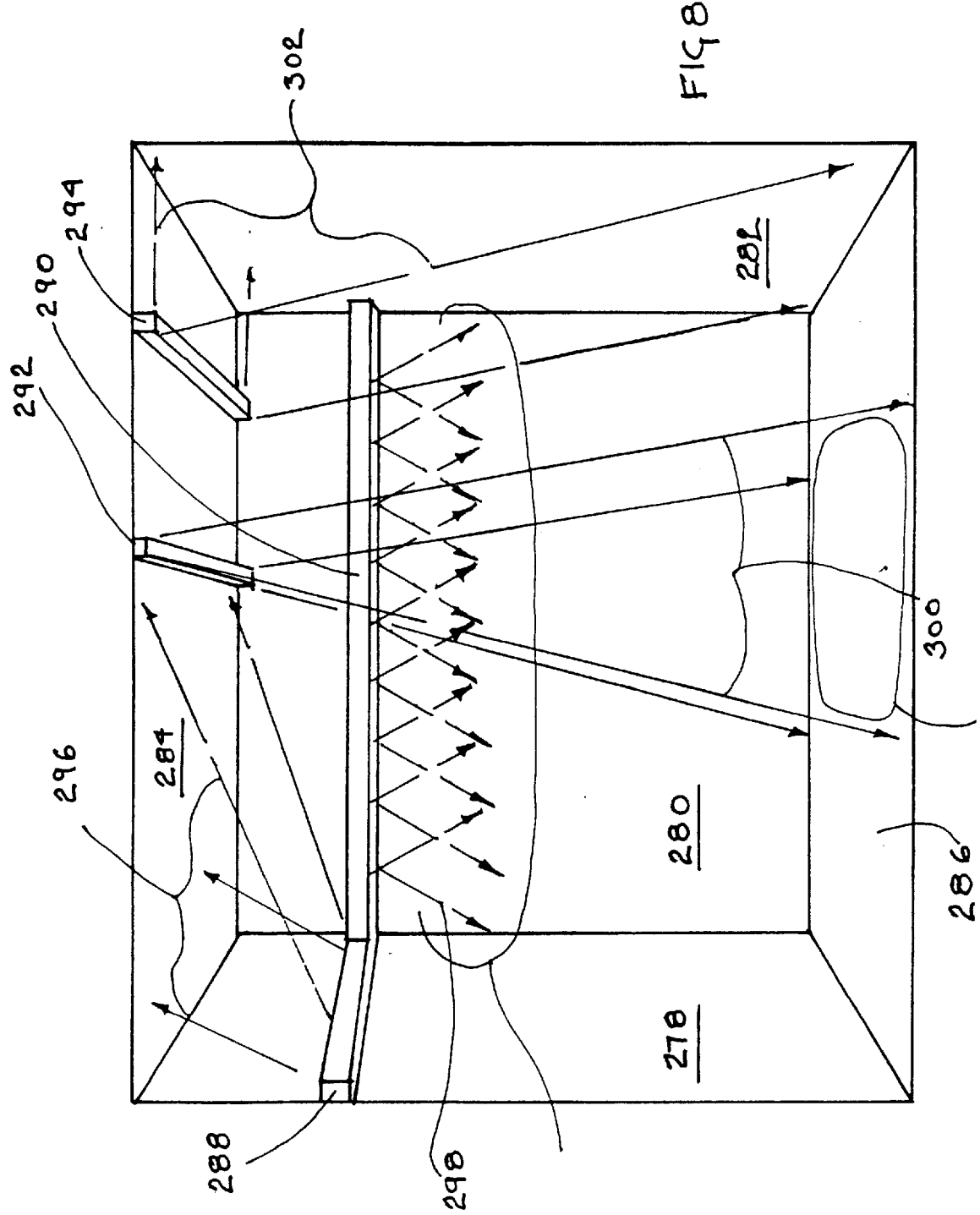

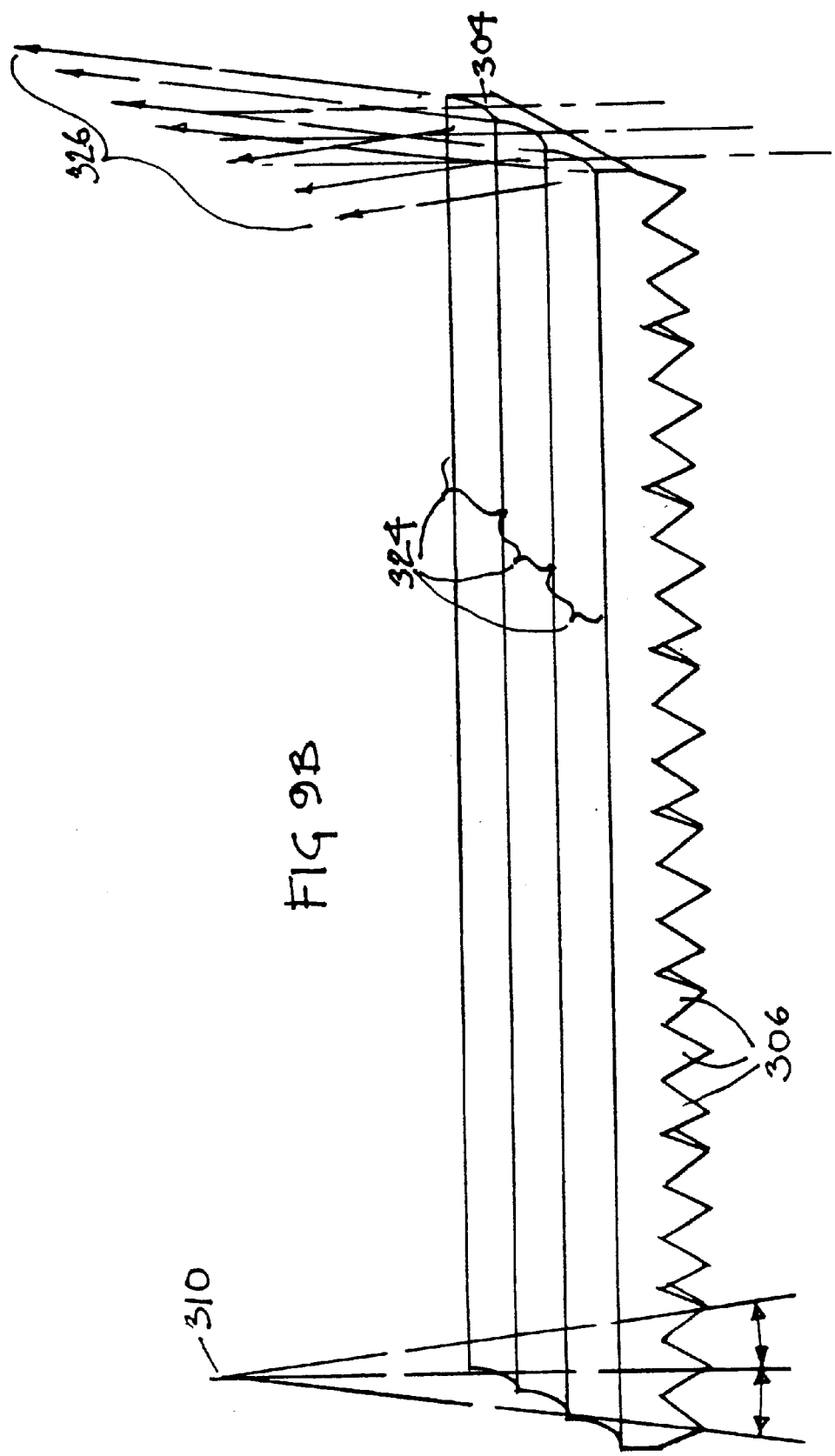

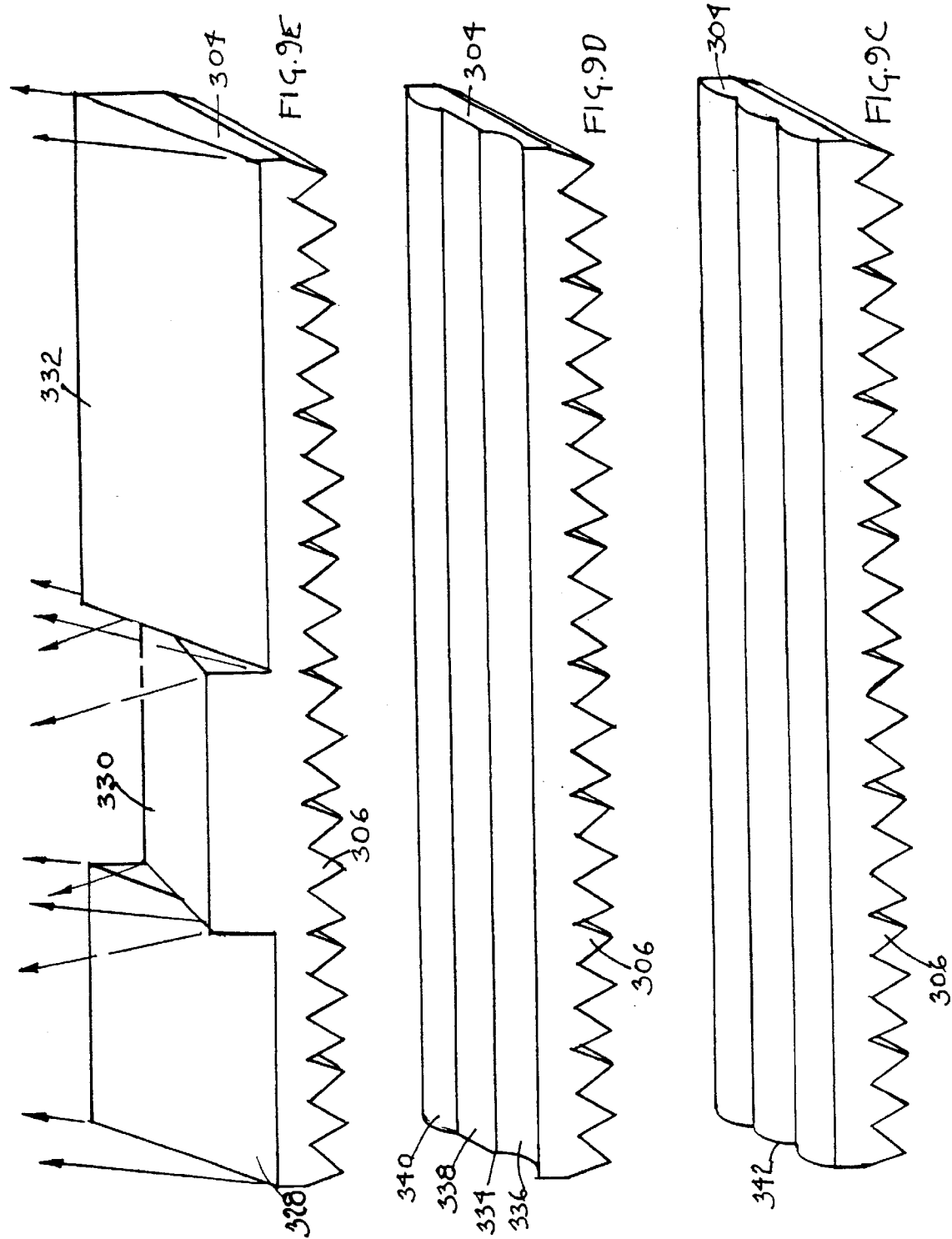

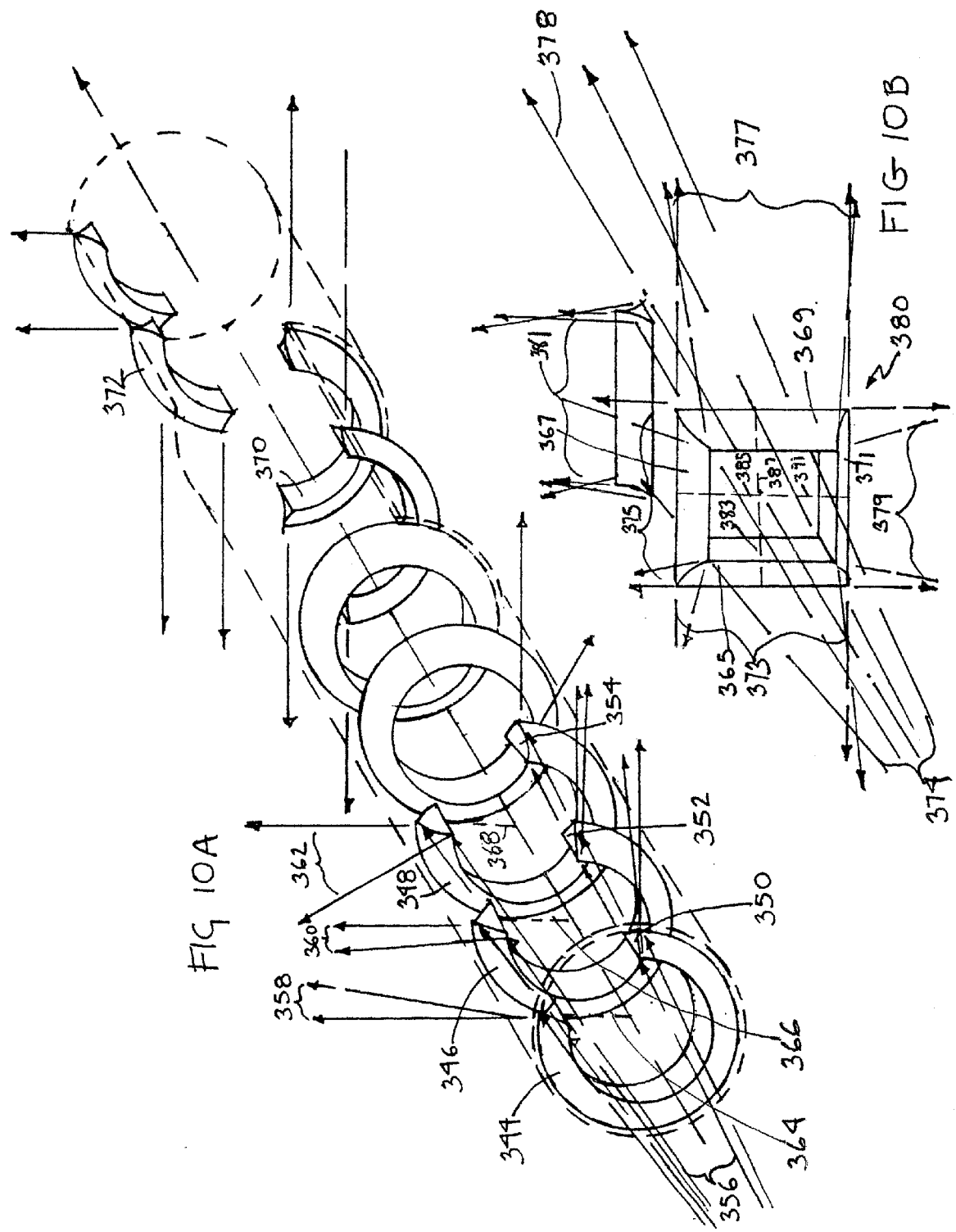

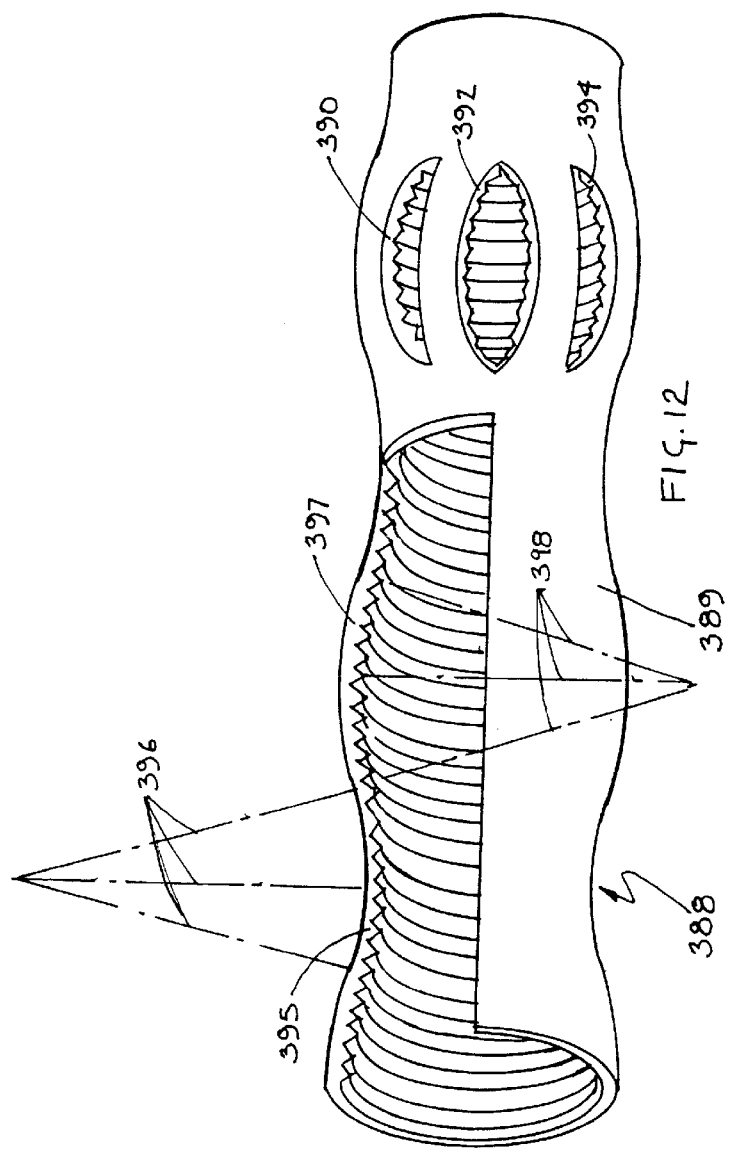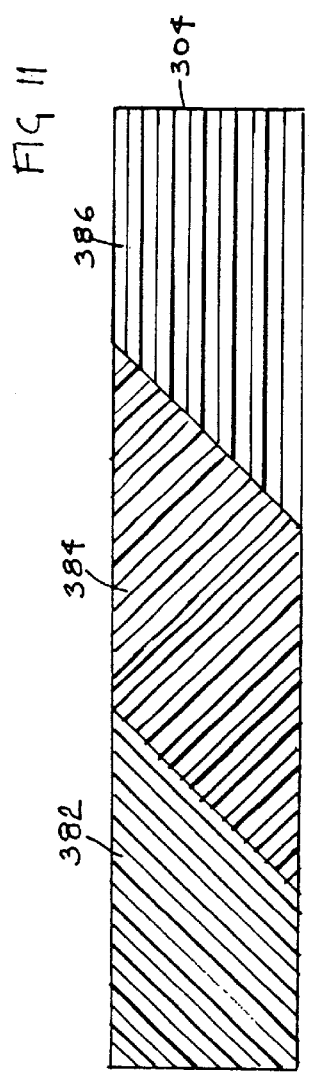

COLLIMATED LIGHT SOURCE WAVE ELEMENT FOR LIGHT SHAPING

REFERENCE TO RELATED APPLICATIONS

This application is a continuation-in-part of and claims priority from the U.S. Provisional Application, Serial No. 60/048,514 filed Jun. 4, 1997. It also claims priority from PCT application No. PCT/US98/11382 filed Jun. 3, 1998.

FIELD OF THE INVENTION

The present invention relates generally to the field of lighting, and, more particularly, to a lighting system containing wave lens and wave reflectors (and other light directors) that segment collimated light traveling along or through lineal or radial pathways and redirect that light in repeated predictable light patterns as to provide uniformly even or graded intensities of light on adjacent or opposite architectural surfaces.

BACKGROUND OF THE INVENTION

In recent years there has been a greater focus on more efficient use of light, e.g., lighting a larger area using lower wattage and/or fewer light bulbs, or other light source, and on using lighting in a more decorative fashion. This has been at least part of the objects of prior U.S. Pat. Nos. 5,046,805, 5,130,908 and 5,676,457.

U.S. Pat. No. 4,984,144 discloses a light fixture having an optical window with a light extraction film therein, the film having a plurality of linear prisms facing the interior of the light fixture.

U.S. Pat. No. 1,827,963 discloses an illuminating unit in which a lamp is used together with a glass plate of prismatic form having a ribbed surface.

U.S. Pat. No. 2,165,305 discloses a signal device using a spot of light which rotates about the periphery of the signal face whereby the light beam passes through a series of light channels.

U.S. Pat. No. 1,377,184 discloses a vehicle headlight for distributing light energy into a predetermined zone while eliminating radiation outside of that zone, according to the patentee.

U.S. Pat. No. 4,345,303 discloses a vehicle headlamp using two fresnel lenses one being equivalent to a diverging lens and the other being equivalent to a converging lens according to the patentee.

U.S. Pat. No. 5,588,743 discloses a luminaire having an optical element shaped as a fresnel type element so the light impinging upon it from the light source is redirected at a specific angle.

SUMMARY OF THE INVENTION

An object of the present invention is to provide a cost effective lighting system to be used in commercial, residential and industrial applications.

A further object of the present invention is to provide a visually unbroken pathway of illumination along a lineal pathway.

Another object of the present invention is to provide a lighting system that provides lineal light distribution, other than fluorescent and neon systems.

A further object of the present invention is to provide a lineal lighting system that uses periodically placed point sources along the "fixture pathway" thus reducing the amount of light bulbs now being used in conventional lineal lighting systems.

Still another object of the present invention is to provide projected illumination along a lineal pathway that is precise and controllable in cross-sectional brightness and patterning.

Yet another object of the present invention is to provide a lineal lighting system that can be manufactured in different lengths and varied cross-sectional dimensions and shapes so as to be used in varied architectural requirements.

Another object of the present invention is to provide a lighting system that can be customized in terms of light output to meet varied architectural lighting requirements.

These and other objects can be accomplished, in a lighting assembly having substantially collimated light as a source which is usually artificial light, but could be partially or totally sunlight, and light transmission means or the equivalent for distributing light (and in some cases this could be the collimating means). There is a multi-faceted wave light modifying means for modifying the direction of substantially collimated light. In some arrangements, the transmission means has a section which allows transmission of light therethrough. The multifaceted wave light modifying means is located in the transmission means for receiving substantially collimated light and redirecting it to pass through the section thereof which allows transmission of light and provide illumination outside of the transmission means. The system is constructed and arranged so that there is lineal, transverse and radial light control by the design of the collimation means, the wave light modifying means and the transmission means.

BRIEF DESCRIPTION OF THE DRAWINGS

The means by which the foregoing objects and features of invention are achieved are pointed out with particularity in the claims forming the concluding portion of the specifications. The invention, both as to its organization and manner of operation, may be further understood by reference to the following description taken in connection with the following drawings.

FIG. 1A is a schematic view, substantially a side elevation, of an arcuate wave lens.

FIG. 1B is a schematic view, substantially a side elevation, of the arcuate wave lens of FIG. 1A showing rays of light being refracted by the lens.

FIG. 1C is a schematic, substantially isometric, view of the wave lens of FIGS. 1A and 1B.

FIG. 1D is a schematic, substantially isometric, view of the wave lens having a compound shape.

FIG. 1H is a schematic, substantially isometric, view similar to FIG. 1C having multiple inner surfaces.

FIG. 1I is a schematic cross-sectional view of a lens similar to that of FIG. 1H but showing an inclined inner surface.

FIG. 1J is a schematic cross-section view similar to FIG. 1I but showing a multiple convex inner surface.

FIG. 1K is a schematic cross-sectional view similar to FIG. 1I but showing a multiple mixed inner surface including a concave, a flat and a convex inner surface.

FIG. 2A is an isometric view of a lineal element to which a series of lenses of the types shown in FIG. 1 is attached.

FIG. 2B is an isometric view of a segmented lineal channel lens assembly similar to FIG. 2A.

FIG. 2C is a bottom elevational view of the assembly shown in FIG. 2B.

FIG. 2D is a cross-sectional view of one type of rib which can be used for the channel of the assembly shown in FIGS. 2B and 2C.

FIG. 2E is a cross-sectional view similar to FIG. 2D showing another type of rib which may be used for the channel of the assembly shown in FIGS. 2B and 2C.

FIG. 2F is a cross-sectional view of one type of channel assembly which may be used with the structure shown in FIGS. 2B and 2C.

FIG. 2G is a cross-sectional view of a second type of channel assembly which may be used with the structure shown in FIGS. 2B and 2C.

FIG. 2H is a cross-sectional view of a third type of channel assembly which may be used with the structure shown in FIGS. 2B and 2C.

FIG. 2K is an isometric view of a tubular transmission lighting arrangement.

FIG. 3A is a schematic view of a light distribution assembly along a lineal path using the types of lenses shown in FIG. 1 with collimated light entering from each end.

FIG. 3B is a schematic view of a light distribution assembly similar to FIG. 3A in which the lower surface of the tubular part is inclined upwardly.

FIG. 3C is a schematic view of a light distribution assembly of the type described in which light is received evenly from two light sources simultaneously.

FIG. 3D is a schematic view of a light distribution assembly of the type described in which a continuous wave lens is used.

FIG. 3E is a schematic view of a light distribution assembly similar to FIG. 3C but where the two light sources are disposed internally of the tube.

FIG. 3F is a schematic view of a light distribution assembly similar to FIG. 3E in which light reflection is used.

FIG. 3G is a schematic view of a tubular light distribution assembly using a glass rod.

FIG. 3H is a schematic view of a light distribution assembly of the type described in which a continuous wave lens with concave sections is used with two light sources.

FIG. 3I is an enlargement of the portion of FIG. 3H showing the light source and the reflectors which reverse the beam direction.

FIG. 3J is a view similar to FIG. 3I but showing the beam axis at an angle to the longitudinal axis of the device.

FIG. 4 is a schematic view of a wave lens using paired prisms for the outer concentric surface.

FIG. 6 is a side view of a combined light transmission system showing the use of different types of patterning of light.

FIG. 7A is an isometric view of a device of the type described using a radial lens.

FIG. 7B is an isometric view similar to FIG. 7A showing a refractive polygon as the wave lens element.

FIG. 7C is a top view of the lighting arrangement shown in FIG. 7B.

FIG. 7D is an isometric view similar to FIG. 7A using a ring reflector.

FIG. 8 is an isometric view of a room in which some of the lighting arrangements of the present invention are being used.

FIG. 9B is a schematic view of a flat lens having a multiple concave inner surface.

FIG. 9C is a schematic view of a flat lens having a multiple inner surface which is concave.

FIG. 9D is a schematic view of a flat lens having a multiple inner surface which varies, showing a concave, a flat and a convex portion.

FIG. 9E is a schematic view of a flat lens having a multiple inner surface including the type shown in FIG. 1I.

FIG. 10A is an isometric view of a lens formed of a series of ring reflectors.

FIG. 10B is an isometric view of a lens formed of a square ring reflector.

FIG. 11A is a plan view of a prism bar as shown in FIG. 9A showing prisms at varying angles to the longitudinal direction of the bar.

FIG. 12 is an isometric view, partially broken away for clarity, of an undulating cylindrical form wave guide.

DESCRIPTION OF THE PREFERRED EMBODIMENTS

Figure 1E:
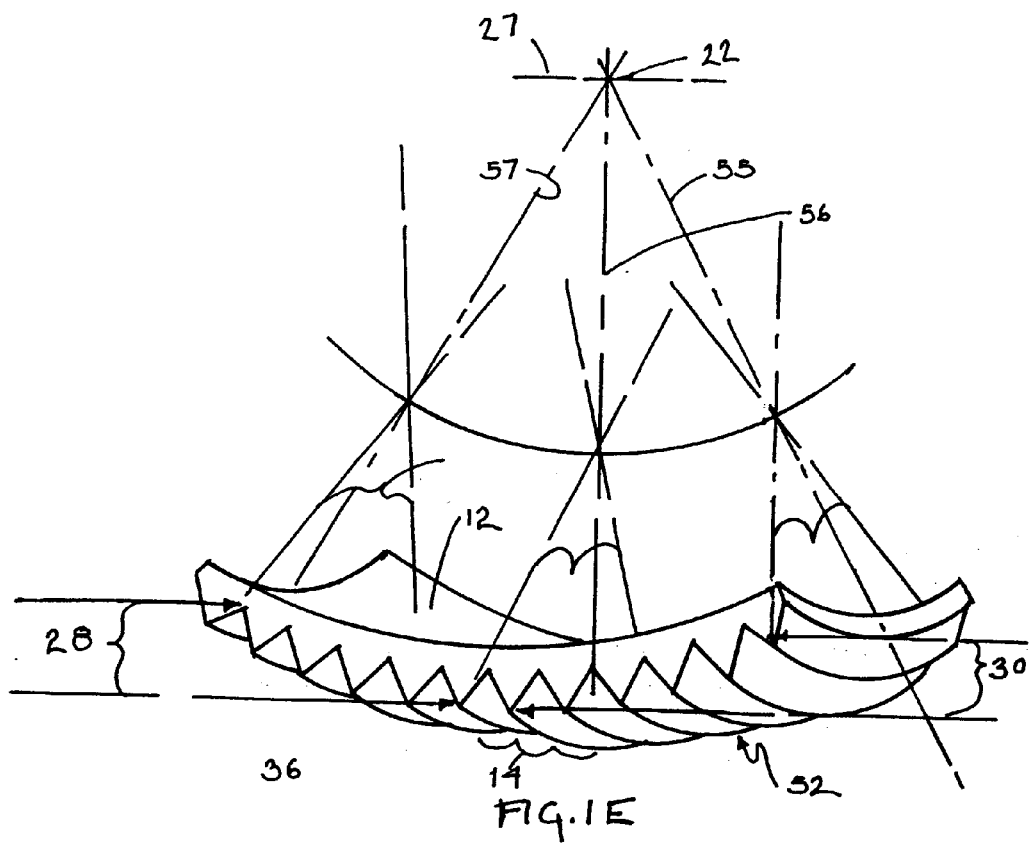
FIG. 1E is a schematic, substantially isometric, view of the wave lens of FIG. 1D having a modified compound shape.

The preferred embodiments of the present invention are described below, and include wave lenses and construction methods for collimated point source linear and grid distribution. Since the source is not an actual point, it will frequently be referred to as a quasi-point source. For at least some embodiments, it is possible that sunlight or other types of light may be used as the light source. Also, while collimation is desired, it may not be perfect for various reasons and may be considered to be quasi-collimated. A single quasi-point source is used to provide a lineal pattern of illumination. The cross-section of light is controllable in the lineal projection.

The quasi-collimated nature of the light (imperfect collimation) having, for example, 5–10% dispersion is made use of by the present invention. This is described in further detail below.

In most of the figures, for simplicity in showing other features of the invention the light ray path through the prisms are not shown completely accurately since in most cases the light ray is slightly refracted when it passes through the first surface of the prism it reaches. Since this is difficult to show when there are so many prisms which are so small in the drawings, these rays are shown as though they passed straight through the first surface (which refracts the rays) but is shown correctly at the second surface of the prisms which it reaches (which reflects the rays). FIG. 1L of the drawings is provided to show the actual path which the rays follow when entering the first surface of the prism (refraction) and when reaching the second surface of the prism (reflection).

In some of the figures which are called isometric, they are not perfectly isometric, since side surfaces of the lenses may be shown as side elevations for clarity.

In the set of figures called FIG. 1, the light is a continuous lineal projection of light, i.e., one that is not broken as viewed on the surface to which it is projected.

FIG. 1A is a side view of an arc-shaped lens 10, having radii and concentric surfaces. There is an inner concentric surface 12 which is smooth (and may be polished or contain a refracting surface). The outer concentric surface 14 is composed of a plurality of prisms 16. The centerlines 20 through the base 24 and the centerlines 18 through the apex 26 of each prism 16 each lie on a radius of the concentric surfaces having their center point at the focal point 22 of the lens (in this two dimensional drawing). In this, and in the other figures, the focal distance can be changed by increasing or decreasing the radius of the arc on which the concentric surface 14 lies.

FIG. 1B is the same view as FIG. 1A, using the same reference numerals, with the addition of collimated light or ray bundles or light rays 28 from the left and light rays 30 from the right (they are light rays in this example, but could be another form of electromagnetic energy). This light is collimated by known means from a quasi-point source such as an electric lamp of suitable type or from a pre-collimating source (such as the sun). The light 28 and 30 may strike the entering and reflecting surfaces of the prisms at multiple angles (basically a different one for each prism) because of the orientation of the prisms in an arc. If the light is essentially parallel, all of it will focus at the focal point 22 (in two dimensions) which is the center of the concentric arcs of circles 12 and 14. It should be noted that the concentric surfaces 12 and 14 may lie on an arc of a parabola or other type of curve than an arc of a circle which is shown in FIGS. 1A and 1B. Reference line 27 is generally parallel to the bundles of collimated light 28 and 30.

FIG. 1C is a three dimensional projection of FIGS. 1A and 1B, with a reduced amount of light rays 28, 30 being illustrated for purposes of clarity. Also shown is that the inner and outer concentric surfaces 12 and 14, respectively, are concentric to one another, i.e., parallel and are shaped to lie on concentric cylinders. Light rays 28, 30 striking the prisms 16 are refracted parallel to radii 32 (six of which are shown) and towards a radii line 34 formed by all of the radii, one for each plane for the width of the lens 10. The lens 10 may be made from a block or as an extruded material or a refracting film of material 48 which can be glass, plastic or other suitable material.

FIG. 1D is a three dimensional projection showing a second type of lens 50, which is a variation of the lens 10 illustrated in FIGS. 1A, 1B and 1C. This lens 50 is formed as a compound curve or wave. In this case it is a convex curve. One curve, which can be seen most clearly at the longitudinal edge 36 of the lens 50 is as described in the above mentioned FIG. 1. Points 39 lie on radii of the transverse curve. In FIG. 1D these points 39 lie on an arc 38 which is concentric with the centerline of the concentric surfaces. The other curve is convex and can be seen most clearly at the transverse edge 46 of the lens. Parallel light entering prisms 16 on surface 14 are refracted and redirected towards focal or radii line 40. Rays 42 are diverging away from radius 44, which is the center line through the prisms, along radii line 40.

FIG. 1E is a three dimensional projection of a variation of FIG. 1D having a third type of lens 52 which is the second lens of the compound type to be disclosed, and which is a different type of compound lens than the one shown in FIG. 1D. In this case it is a convex curve. Lens 52 has one curve seen most clearly at the longitudinal edge 36 being the type of curve disclosed in connection with FIG. 1. The second curve is best seen at the transverse edge 54 of the lens as being concave. In lens 52 the center points of the 2nd compound curve lies on radii 55, 56, 57, etc., between concentric arcs 12, 14 and radii point 23. Light rays contained within the bundles of light rays 28 and/or 30 enter prisms on surface 14 and are refracted in a convergent path of rays 42 toward arcuate focal line 41. The reference line 27 is generally parallel to ray bundles 28 and 30.

Figure 1F:
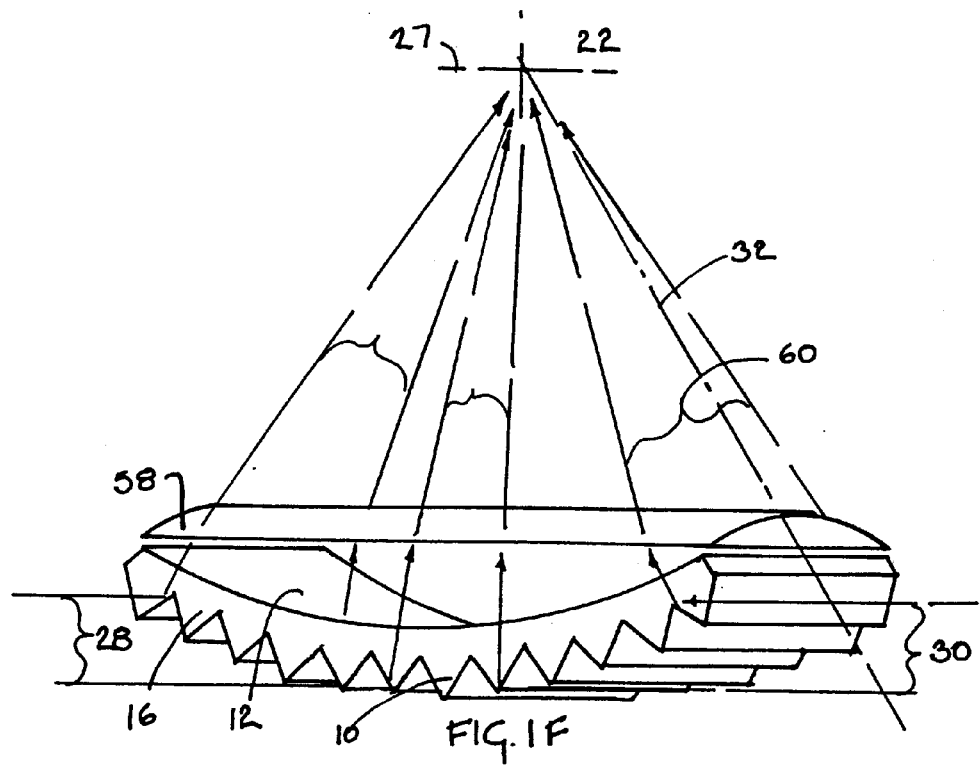
FIG. 1F is a schematic, substantially isometric, view of a compound wave lens assembly.

FIG. 1F is a three dimensional projection of a variation of FIG. 1C in that the lens depicted in the latter figure is made compound by coupling it by a positive cylindrical lens 58. The surface of lens 58 may be perpendicular to the focal point 22 or be concentrically parallel to surface 12. Light rays within 28 and/or 30 are refracted by prisms 16 and focused by lens 58 onto a focal point 22 or points (in which case it is a focal line) that lie on the example radius 32. This is illustrated in converging rays that form the bundles of converging rays 60. The reference line 27 is generally parallel to ray bundles 28 and 30.

Figure 1G:
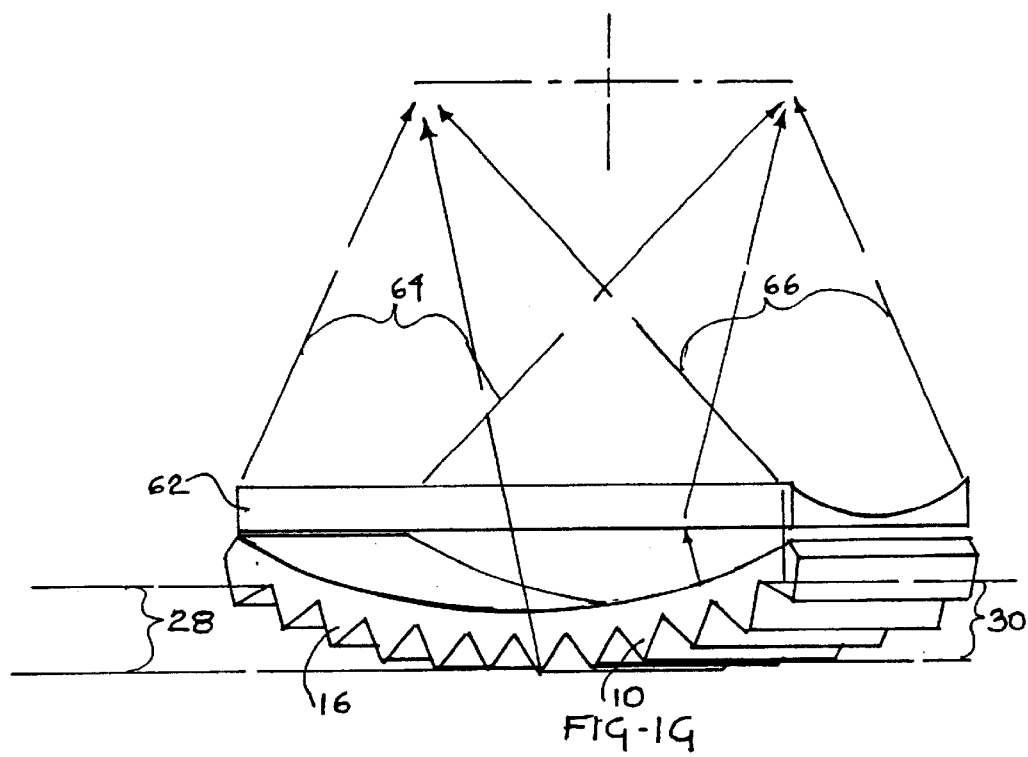
FIG. 1G is a schematic, substantially isometric, view of a compound wave lens assembly which is a modification of the one shown in FIG. 1F.
Figure 1L:
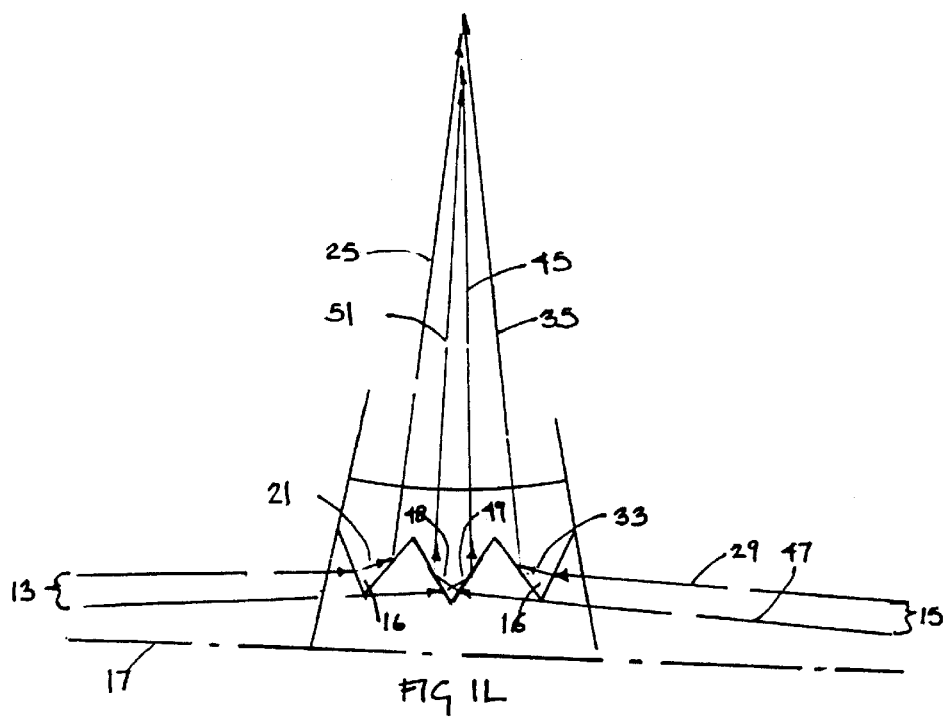
FIG. 1L is a schematic view, substantially a side elevation, showing the refraction and reflection of the rays passing through the prisms.

FIG. 1G is a three dimensional projection of a variation of FIG. 1F in that the coupled lens 62 is a negative cylinder. Light rays contained in 28 and 30 after being refracted by prisms 16 are further refracted by negative lens 62 and form diverging light rays 64 and 66, respectively, which meet at focal line 9.

FIG. 1H is a variation of the lens of FIG. 1C having multiple inner surfaces formed into the lens 63. It is a unified wave lens having three concave sections and is more efficient than the two part system shown in FIGS. 1F and 1G. The light rays 31 are shown emanating on a typical plane and diverging toward radii line 34. The inner surface 12 is made of a triple (three) concave surface 11 as shown.

FIG. 1I is a cross-section of a lens 63 similar to that shown in FIG. 1H but showing an inclined inner surface 65 in the form of a prism wedge lens which bends rays 61 from the prisms to be at an acute angle to the lineal central axis 59.

FIG. 1J is a cross-section of a lens 63 similar to FIG. 1I showing sections 65, which, in this case are three cylindrical convex sections 65 adjacent each other and provides multiple converging rays 60.

FIG. 1K is a cross-section of a lens 63 similar to FIG. 1I showing sections 65, which, in this case are three different type of sections 65, one being concave, one being flat and the other being convex and the rays entering from the prisms are refracted into divergent, parallel and convergent rays, respectively. This type of arrangement may be used when asymmetrical lighting is desired.

FIG. 1L is a side elevation showing the exact path of the light rays. Bundles of rays 13 and 15 are shown coming from the left side and right side, respectively. The beam axis 17 is shown below the rays and it is seen that the rays 13 and 15 are divergent from the beam axis as a result of imperfect beam collimation or purposeful beam direction. The beam axis 17 is the path the rays would occupy if there were perfect collimation. An upper beam 19 from ray 13 enters the closest surface of a prism 16 and is refracted as shown at 21 and then impinges upon the next surface of the prism and is reflected as shown by beam 25. At the other side an upper beam 29 from ray 15 enters the closest surface of a prim 16 and is refracted as shown at 33 and then impinges upon the next surface of the prism and is reflected as shown by beam 35. A lower beam 37 from ray 13 enters the next prism and is refracted as shown at 43 and then impinges upon the next surface of the prism and is reflected as shown by beam 45. At the other side, a lower beam 47 from ray 15 enters the next prism and is refracted as shown at 49 and then impinges upon the next surface of the prism and is reflected as shown by beam 51.

Thus, there are different types of wave lenses shown in various ones of the FIG. 1: FIGS. 1A, 1B and 1C show a flat type of simple curve wave lens 10; FIGS. 1D and 1E show two different types of compound curve wave lenses, one with a convex curve 50 and the other with a concave curve 52; and FIGS. 1F and 1G show two different types of compound wave lens assemblies, one with a positive cylindrical lens 58 as the second lens in an assembly lenses 10, 58, and the other with a negative cylindrical lens 62 as the second lens in an assembly of lenses 10, 62.

Figure 2I:
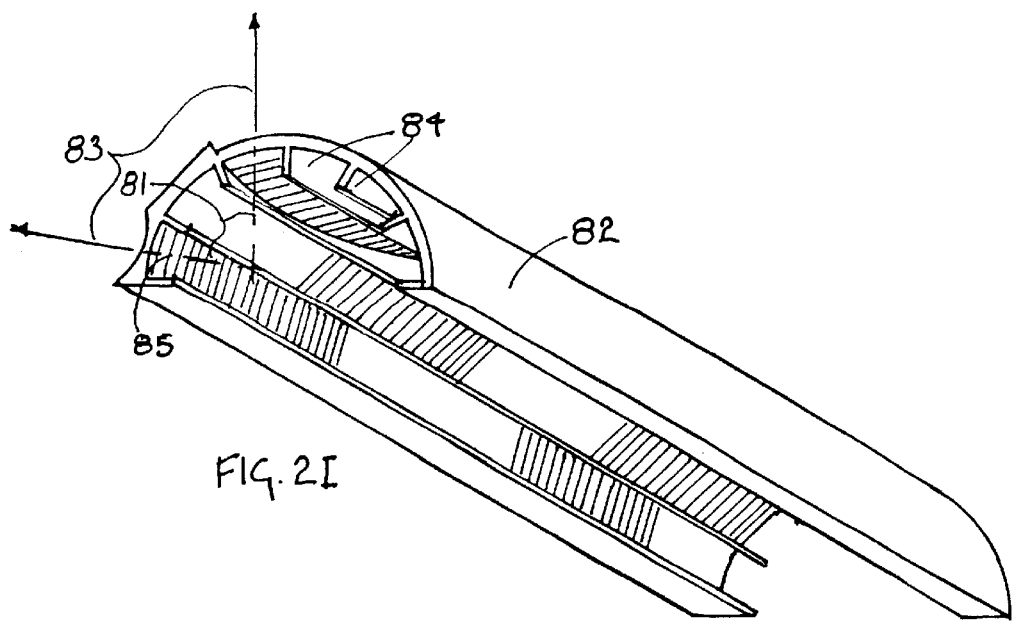
FIG. 2I is an isometric view of a channel assembly similar to the one shown in FIGS. 2B and 2C, but with the housing being a portion of a cylinder instead of being linear.

FIG. 2A schematically illustrates a lineal structural element 68 (of transparent or translucent material) onto which is attached, a series of lens or lens assemblies 70, which may be any of the types of lenses disclosed in FIG. 1, i.e., simple lenses 10, 50 or 52, or compound lenses 10, 58 or 10, 62. If desired, the lenses used could be a combination of 50 or 52 with one of the cylindrical lenses 58 or 62. Lens 70 may be a film mounted in grooves 73 which maintain the curvature of the lens.

FIG. 2B is a three dimensional diagram showing a flat structural element 72, whic may be channeled, onto which the wave lenses may be mounted. This structural element is in the form of a segmented channel (or channels) of extruded or molded transparent material 74. Each channel 75 is formed by webs or ribs 76 and contains staggered lenses, of the types shown in FIG. 1, as discussed in connection with the description of FIG. 2A. There is a source of collimated light 78 provided for this arrangement. This source can be a quasi-point source, or can be from light transmitted from outside the structure and through the circular opening 179. A containment means 80 can be provided which is transparent, at least at those locations where the light is to be projected outside of the structural element 72.

FIG. 2C illustrates one of many patterns that can result from staggering the wave lenses 70 within the channels 75 of channeled structural element 72.

FIGS. 2D and 2E are cross sectional views of channeled structural element 72 showing channels 75, illustrating some of the different cross sectional shapes to the webs or ribs 76 of the channels so designed to hold the lenses 70 in position and also maintain particular curvatures. The ones shown are in the shape of a "T" as in FIG. 2D or conical as in FIG. 2E, but may be of other shapes. As stated earlier in connection with FIG. 1, the lenses may be of blocks or extrusions of material or may be of film-type material. The lenses may be slid in and out of the channels so that they are interchangeable. Also, the ribs can be made of material capable of flexing, for this same purpose.

FIG. 2F is a cross-sectional view transversely through the structural element 72 showing the use of compound wave lens 10, 58 as shown in FIG. 1F which provides for the light to converge to a focal line 34 and then diverge beyond the focal line. The lens arrangement in FIG. 2F creates multiple focusing through a point then divergence. While not shown in these figures (FIGS. 2F–2H) (for purposes of clarity), the prisms shown in FIG. 1 are also used.

FIG. 2G is a cross-sectional view transversely through the structural element 72 showing the use of compound wave lens 10, 62 as shown in FIG. 1G which provides for the light rays to diverge. The lens arrangement in FIG. 2G provides multiple divergence.

FIG. 2H is a cross-sectional view transversely through the structural element 72 showing the use of a combination of different lenses in the adjacent channels. In this FIG. lens 10, 58 (FIG. 1F) is used in the first channel, lens 10 (FIGS. 1A, 1B, 1C) is used in the second channel and lens 10, 62 (FIG. 1G) is used in the third channel. The light distribution for FIG. 2H provides a combination of convergence, focusing, divergence, and pass-through collimated light to create an asymmetrical distribution, providing varied transverse sectional light.

In FIGS. 2F, 2G and 2H, second lenses can be used so that a compound type lens is formed. In FIGS. 2D and 2E the fins or the lenses can be of a material which can be flexed so that the lenses can be changed from or to any of the lenses shown in FIG. 1.

The lighting structure shown in FIG. 21 is a variation of the lighting structure shown in FIG. 2B in that the lenses (or reflectors) 85, which may be prisms, are provided on a channeled, cylindrical structural element 82. The webs or ribs 84 of the channel are formed about radii. Light rays 83 passing through and parallel to element 82 strike prisms 85 and are refracted away from element 82 on radii 81 of element 82.

Lenses which are disclosed in FIG. 1 are shown that may be part of the structure of FIG. 2.

Figure 2J:
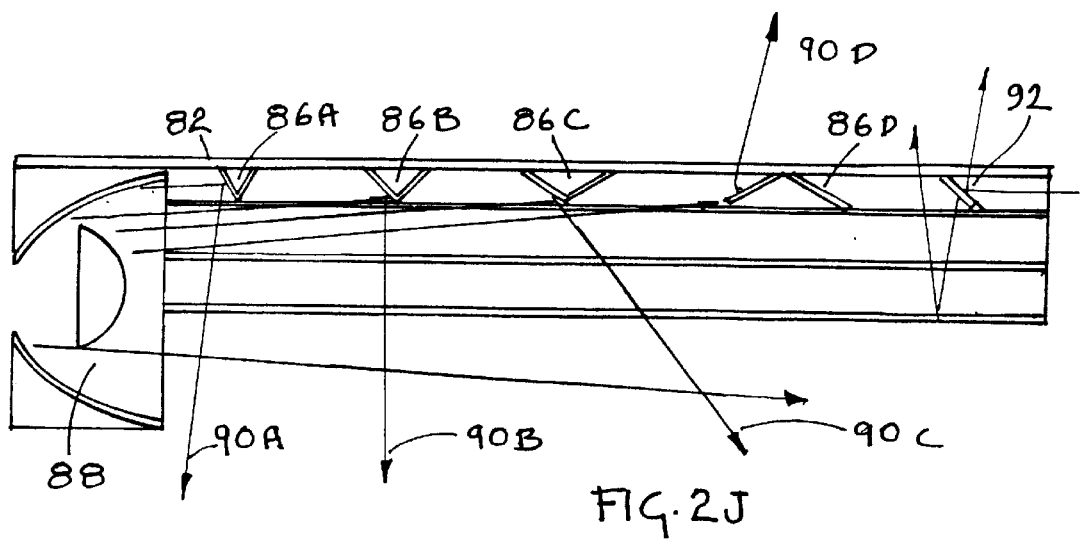
FIG. 2J is a cross-sectional view of another arrangement showing individual reflectors being used within an individual radial channel.
Figure 5A:
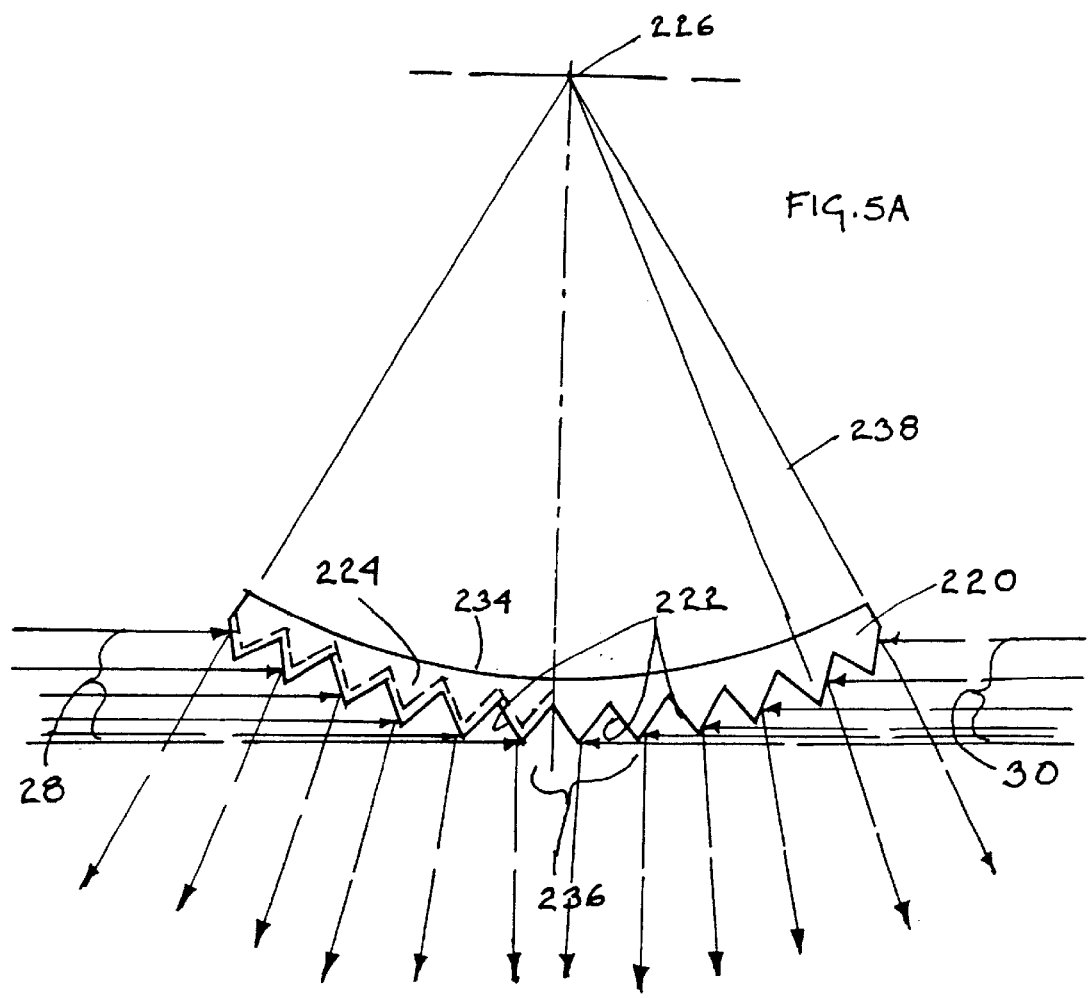
FIG. 5A is a schematic view of a wave lens arranged for the light to be reflected in the opposite direction that the light travels in FIG. 1.
Figure 5B:
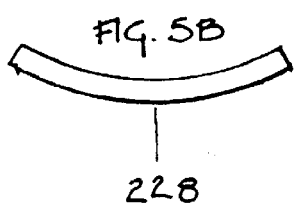
FIG. 5B is a cross-sectional view of FIG. 5A showing a first lens shape.
Figure 5C:
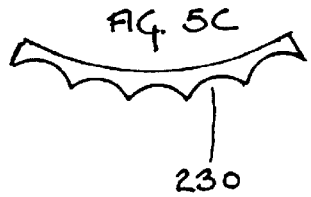
FIG. 5C is a cross-sectional view of FIG. 5A showing a second lens shape.
Figure 5D:
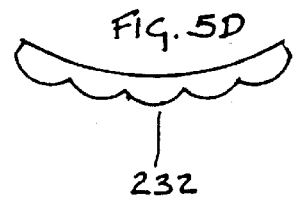
FIG. 5D is a cross-sectional view of FIG. 5A showing a third lens shape.

FIG. 2J is a cross sectional view of an arrangement provided on a channeled cylindrical structural element 82, illustrating individual reflectors 86 installed within an individual radial channel as an alternative to the prism lenses 85. Each reflector 86A, 86B, 86C, 86D receives light rays from the source of collimated light 88 and reflects light 90 as individual beams 90A, 90B, 90C, 90D, respectively. There is also a two-sided reflector 92 provided. Each beam's direction is determined by the various angles and orientation provided. The function of the reflectors is similar to those shown in FIG. 2K, i.e., changing or alternating the angles of these reflectors alters the angle of reflection with respect to the central beam axis.

FIG. 2K is an isometric view of a tubular transmission means 93 having a specular lineal section 94 (which extends along the lower portion of the tubular transmission means 93), and a transparent lineal or tube section 95 (which extends along the upper portion of the tubular transmission means 93). Reflector means 96 and 97 are mounted at angles to the centerline of the tube and receive the collimated light rays within from light bundles 28 and 30. The acute (to 94) angle face (or reflecting surface) 104 of reflector element or lens 108 (which faces specular lineal section 94) receives light rays within light bundle 28 and reflects light downwardly towards specular section 94 which reflects light 98 toward and through transparent section 95. Simultaneously, the obtuse angle (to 95) face (or reflecting surface) 105 of reflector element 108 (which faces transparent lineal section 95) receives light from light bundle 30 and reflects light 99 directly towards and through transparent tube section 95.

Similarly reflector means 97 repeats the function of reflector means 96 twice. Thus, it has two reflecting elements 106 and 107 whereas reflector means 96 has one reflecting element 108. Reflecting element 106 is oriented similarly to reflecting element 108 and has a reflecting surface 114 which reflects light 28 first downwardly to the specular surface 94 of the transmission means 93, and is reflected therefrom through transparent section 95, the light being shown at 100. This is repeated by reflecting element 107 which has a reflecting surface 124 which reflects light to specular surface 94 and then through the transparent section 95, the light being shown at 101. Reflecting element 106 also has a reflecting surface 115 which reflects light 30 upwardly through the transparent section 95, the light being shown at 102. Similarly, reflecting element 107 has a reflecting surface 125 which reflects light 28 upwardly through the transparent section 95, the light being shown at 103.

Reflector means 96 and/or 97 may be patterned along the axis of a round (as shown) tube 93 or within a square or other geometrical shape of tube.

FIGS. 3A–3D show a vehicle for distributing light (or other electromagnetic wave lengths) along and away from a lineal pathway utilizing lenses as described in FIGS. 1A, 1B, 1C, 1D, 1E and combining lenses with lens support systems as in FIGS. 2A–2K and a channel system constructed with reflectors.

By balancing the degree of collimation by suitable arrangement and construction of the left and right collimating means, the cross sectional size and shape of the channels and the reflective angle, an equal amount and cross sectional intensity of the light will strike the prisms 16 of each lens. In turn, the light pattern projected away from the lineal pathway will be predictably repetitive, forming an evenly modulated beam.

FIG. 3A shows a system which includes a left collimation means 120, which includes a reflector and a lens, providing collimated light to transmission means 132 to a first lens 112 having a focal line 110 comprised of a plurality of focal points in a line, and to a second lens 113 having a focal line 116 and a third lens 117 having a focal line 118. The lenses are arranged so that each side of the prisms 16 receives collimated light either (1) from a collimating means 120 which receives light from a light source such as light source 134 (which may be a quasi-point source or (2) from reflected light from specular surface or reflector 122 on the right side of the transmission means 132. The arrangement shown in FIG. 3A relies on the reflector 122 being at a prefixed angle "A" to provide light from the right side of the transmission means 132. The lower portion of the transmission means provides a specular surface or reflector 128. In this manner, one form of channel 130 is provided, comparable to the channels described in connection with certain of the FIG. 2.

FIG. 3B shows a somewhat similar system in which the transmission means 136 has an inclined specular surface or reflector 126 at a predetermined angle "A" with respect to the longitudinal axis of the transmission means, thus regulating the amount and cross sectional intensity of the light striking the prisms 16. Reflector 138 at the right side of the transmission means reflects light back to the prisms 16 in a similar manner as reflector 122 of FIG. 3A, but it is not inclined with respect to the longitudinal axis of the transmission means as is reflector 122 of FIG. 3A, but is at a 90 degree angle. In this manner another form of channel 140 is provided. FIG. 3C shows another arrangement which further illustrates how lenses (and prisms) may receive light evenly from two light sources simultaneously, the left light source 120 and the right light source 121. Transmission means 145 is provided with inclined lower specular surfaces 146 and 148 providing a double incline. Surface 146 is at an angle "B" with respect to the longitudinal axis of the transmission means, and surface 148 is at an angle "C" with respect to the longitudinal axis of the transmission means. This arrangement may have left side and right side color filters 142 and 144, respectively, so that the mixing of colors with each prism 16 is possible. This structure provides still another form of channel 150.

FIG. 3D shows how a wave may be formed from a series of prisms or be fabricated from a film containing the prisms. This arrangement includes a left light source 120 in a transmission means 152, the lower portion 158 of which is a specular surface. The right end has reflecting surface 154 and a lens 156 of wave shape is provided to form yet another form of channel 160.

FIG. 3E shows a variation of the systems illustrated in FIGS. 3A–3C with the primary difference being that the light source 162, through the light assembly, projects two opposing beams simultaneously, one to the left and one to the right. The light assembly is composed of left and right collimating means 164 and 166, respectively having left and right collimating reflectors 168 and 170, respectively, which direct the light to the lenses 172, 176, 178 and 180. The focal plane (point) 174 for lens 172 is shown. The distribution of light rays through focal points for the other lenses is the same as for lens 172. The transmission means 182 on the right side of the light source is similar to those of FIGS. 3A and 3D. However, the transmission means 184 on the left side of the light source is inclined similar to the structure shown in FIG. 3B and FIG. 3C, and the inclined section has a specular inside surface to reflect light. By placing light source 162 between lenses 172 and 178, the light source apparatus is not visibly apparent in viewing the device. Thus, a different type of channel is provided.

FIG. 3F shows a variation of the assembly shown in FIG. 3E in that reflectors are used rather than lenses. The principle of reflecting light rays rather than refracting them has been discussed previously and is shown further in FIGS. 5A–5D to be discussed in more detail below. This structure uses multiple reflectors or lenses 186, 188, 190 and 192 that substitute for the refractors that are utilized within systems as illustrated in FIGS. 3A, 3B, 3C, 3D, 3E, and 3G. Further, this type reflector system can be fabricated in a wave form as shown in FIG. 3D by vacuum metalizing the prismatic surface of the wave. The light source 162 is here, too, provided between the lenses 186 and 190, and the light is projected to the left and also to the right. FIG. 5 show varied specular surfaces which may be used on the reflectors as described in more detail below. A transmission means 194 is provided and thus another form of channel is provided.

FIG. 3G illustrates a further form of the lighting assembly of the present invention in which a series of "waves" or wave lenses 196, 198 and 200 are formed into a clear polished or cylindrical rod 202 (possibly a fiber optic.) These waves 196, 198, 200 are composed of polished prismatic grooves 197 that lie on a cylindrical depression formed into the cylindrical rod 202, forming a transmission means, and a curved radial depression of concentric prisms 16 partially extending over an arc of the circumference of the rod at an angle encompassing the entire circumference of the rod, the latter being shown at 200. Light rays traveling through the rod reflect on the prismatic surfaces as illustrated and out through the rod dependent on the curvature on which the prism lie. While three different types of wave lenses 196, 198 and 200 are shown, they may all be of the same type. Lens 196 is made with the prisms being straight across rod 202 to form chords of the circle constituting the cross-section of the rod (in the event the rod is cylindrical and circular in cross-section). Lens 200 are annular prisms extending 360 degrees around the circumference of the rod. Lens 108 are 180 degree prisms similar to those of lens 200 but only extending half-way around the circumference. The light source comes from the left and/or the right side of the rod with the collimated light extending directly into the rod. The light may be from a quasi-point source and the rays then collimated, or from another source providing a similar effect.

FIG. 3H shows a light distribution assembly of the type described above in which a continuous wave lens is used with a light source, and a double collimator, in the middle of the wave lens. The prism assemblies, which in this embodiment are each concave, are grouped together in a linear pattern with no gaps resulting in closely projected exit beams. FIGS. 3H and 3I (the latter figure being an enlargement of the light source, collimation means and beam reverser) show a variation of the system illustrated in FIG. 3E. The light source 162, through the light assembly, projects two opposing beams simultaneously, one to the left and one to the right. The light assembly is composed of left and right collimating means 164 and 166, respectively having left and right collimating reflectors 168 and 170, respectively, which direct the light to the concave lenses 175. The focal planes (points) 177 for lenses 175 are shown. The distribution of light rays through focal points for all the lenses 175 is the same. The transmission means 179 is similar to that of FIG. 3A. It has an inclined reflector 181 (similar to reflector 122 of FIG. 3A) at the ends thereof. By placing light source 162 in the middle of the row of lenses 175, the light source apparatus is not visibly apparent in viewing the device. A reflector 183 above the collimator confines and directs beams to the prisms. There is a beam reversing prism 185 (left side) and a beam reversing reflector or beam reverser 187 (right side). The beam reversing reflector has an upper section 189 and a lower section 191, which, in the example shown are at a ninety degree angle with respect to each other. They alter the direction of rays by 180 degrees so that the rays may enter the prisms above the collimators. The beam reversing prism 185 has surfaces which provide similar functions, so that the light ray paths are the same for both. While both are shown in a single figure, in practice most of the time an embodiment would use two reflectors or two prisms. Following one light beam or ray 195 from light source 162, for example, it is reflected by collimator 166 onto reflector 170 and this reflected beam 197 travels to section 191 of beam reverser 187 and forms beam 199 which goes to surface 189 where it is reflected to form beam 201 which goes to one of the prisms where it is refracted and then reflected to form beam 203. The other reflector 185 handles the light in a similar manner so that lens 175 above the light source may provide substantially the same amount and uniformity of light so that a continuous lineal light is formed by the lighting arrangement shown in FIGS. 3H and 3I. In this manner the entire length of prism assemblies illuminate uniformly. Without the beam reversing reflectors 185 and 189 the prisms above the light source would not be lighted and the lineal lighting assembly would not be uniform since there would be no light coming from the lens 175 above the light source. Also, the reflector 183 hides the collimator and the light source. The lenses shown in FIGS. 9A, 9B, 9C and 9D can be used with the beam reversing reflectors.

FIG. 3J is similar to FIG. 3I, but shows the beam center lines 161, and the central axis 163 of the light transmission device wherein the beam center lines 161 are at an angle to the central axis 163 to control the brightness of the beam on each successive lens 175. This is helpful if there is a need to pitch the collimation means to direct the beam axis down toward the reflector or up toward the lenses 175.

FIG. 4 is a schematic side view of an arched lens 204 having a radius (or other curvature) and concentric surface, the inner concentric surface 206 is smooth and may be polished or contain a refracting surface. The outer concentric surface 208 is composed of prisms 216. As illustrated these prisms are composed of paired first and second right angle segments 210, 212 with a space 214 between pairs. Light rays contained in light bundle from the left 28 and light bundle from the right 30 enter prisms 216 and are refracted toward the focal point (or line) 218.

FIG. 5 show a reflector means with a wave shape similar to the wave shape of the lenses described above. FIG. 5A shows the inner concentric surface or arc 234 having radius 238 and focal point 226. It has an outer wedged surface 236. The wedge peak angles may vary from obtuse to acute. There are light rays contained within light bundle 28 from the left and light bundle 30 from the right which are reflected away from reflector 220 off the outer specular surfaces 222 which are in the shape of wedges 224. FIG. 5B shows the reflector means having a smooth specular surface 228; FIG. 5C shows the reflector means having negative concave flutes on the outer surface 230; and FIG. 5D shows the reflector means having convex ribs on the outer surface 232. This type of reflector can be used, for example, in the arrangement described in connection with FIG. 3F. The surface could also be made of bent specular metal in which case 234 represents an arc on which the wedges lie.

In all of the previously described structures, the lenses can be reflectors of the types described, if desired, in which one manner of creating same is to metalize the surfaces of the prism-shaped surfaces of the lenses whereby they become reflectors, for varied forms of light distribution. Such reflectors can be used in the channels as described previously.

FIG. 6 shows that a plurality of the channels of lighting arrangements 223 and 225 can be placed adjacent to one another, edge to edge, to form a substantial length of lighting. Different ones of the previously described arrangements can be used in assemblies where they are all the same type of element, or where different ones are used for varied effects. Thus, a continuum of light patterning can be achieved over varied distances. The transverse patterns formed may be symmetrical or asymmetrical.

FIG. 7A is a partial sectional view which shows another form of lighting assembly using the principles of the present invention as previously described. A radially refractive lens 240 in the shape of a toroid is provided having a central opening 250 in which the light source 252 is provided, which includes a radial ring lens collimator 244, projecting radially collimated light beams 242 toward the radial prisms 246 of the lens 240. The radial prisms refract the radially collimated light and direct it to form focal ring 248. Each section of the lens has a plurality of focal points which together provide the focal ring 248 and has the same function as described in connection with the lens of FIG. 1B. Thus, the multiple focal points form a ring above the toroidal structure of the lens itself. The prisms have a ring or oval shape or can be provided with another type of curve. Thus, as described above they could be concentric rings or ovals.

FIG. 7B is a sectional view illustrating a refractive polygonal lens 254 assembled from segments 256 of lenses shown and described in connection with FIG. 1C. Surrounding and receiving radially collimated light 258 from radial collimator 260, prisms 267 along the polyhedral form as shown in FIG. 7C (plan view) refract and redirect light through focal segments 262, 264 and 266.

FIG. 7D is a sectional view illustrating a reflector type of lighting assembly following the general principles described in connection with FIGS. 7A, 7B and 7C. A light source 268 provides light to a ring shaped collimator 270 which provides collimated light 272 toward the wedges 274 (which can be the prisms coated with a specular surface) providing reflected light 276 as a result of the collimated light reflecting off the wedge shaped reflectors. The ring reflector has a similar sectional function as described in FIG. 5A and FIG. 3F.

FIG. 8 shows a room in which the lighting of the present invention is used. Three walls (a left wall 278, a back wall 280 and a right wall 282) and a ceiling 284 and a floor 286 are shown. There is one light 288 near the ceiling 284 of the left wall 278 which provides light 296 which provides illumination of the ceiling 284 asymmetrically. There is another light 290 on the back wall 280 near the ceiling which provides wall washing downward lighting 298. A first ceiling light 292 provides a light in the shape of a trapezoidal prism 300 in a longitudinal direction to provide downlight such as for tasks. A second ceiling light 294 provides light 302 that acts as a wall washer by projecting onto right wall 282. This light projects light horizontally along the ceiling to the wall and also at an angle to the right to provide the wall washing effect. The lighting on the ceiling 284 and the wall 278 is provided to be asymmetrical.

Figure 9A:
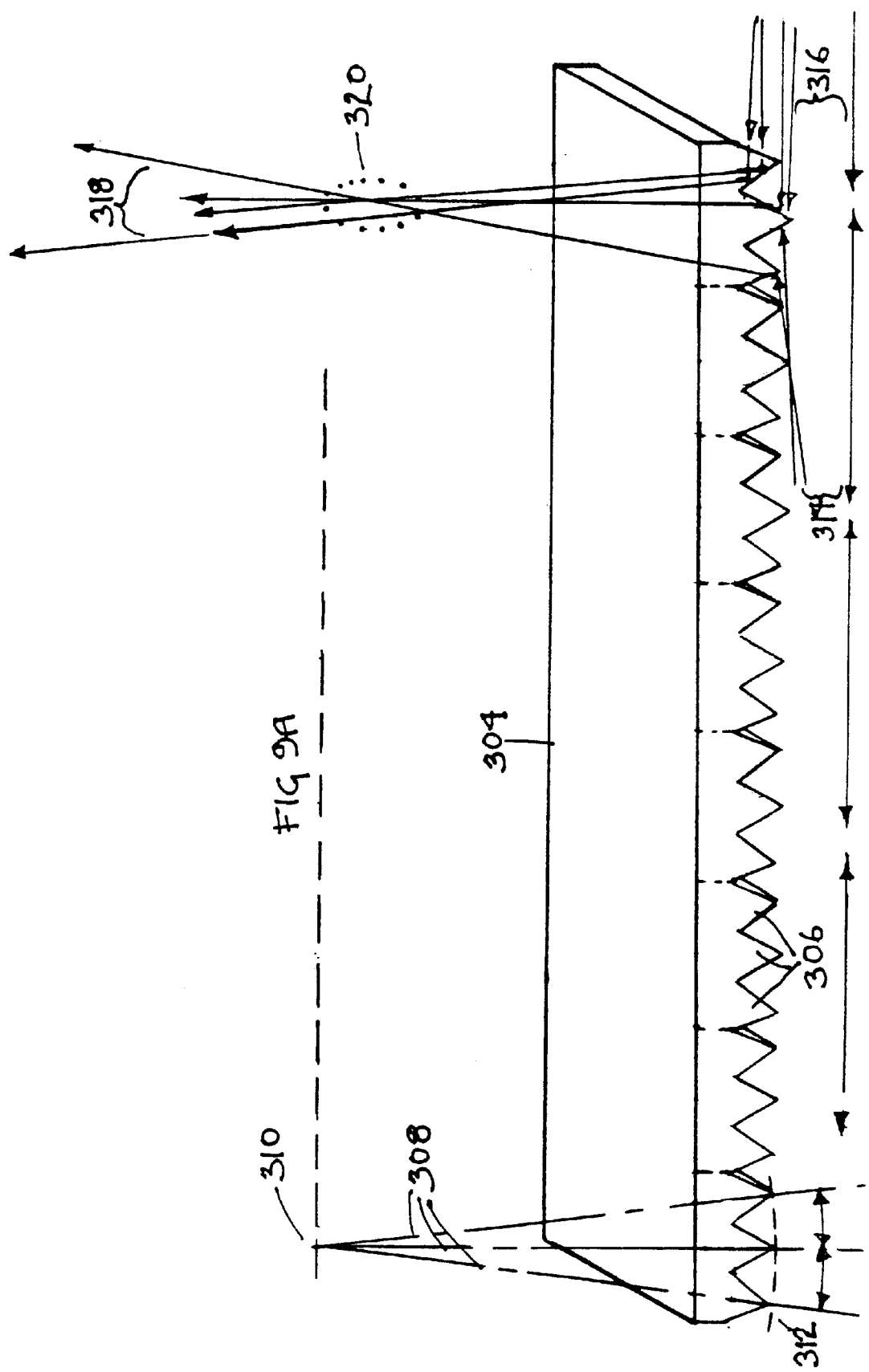
FIG. 9A is a schematic view of a flat lens having a flat inner surface.

FIG. 9A is a schematic view of a flat lens bar 304 having prisms 306 arranged at a right angle to the lens bar 304. The prisms 306 are arranged in groups of three (shown by the dotted lines) and may be "stacked" as individual lenses. The central axes 308 of the prisms 306 converge at point 310 and are radii of arc 312 on which the vertex of each prism 306 lies. Rays 314 and 316 are shown as diverging acutely from collimating sources (not shown) and exit as rays 318 which converge through quasi-point 320 beyond which they diverge. Rays 314 and 316 actually extend for the full length of the lens bar 304, although they are only shown at the left of the figure for clarity.

FIG. 9B is a schematic view of a flat lens bar 304 having a multiple concave inner surface 322 with sections 324, each of which are concave. This figure illustrates the configuration the same as FIG. 9A with the addition of cylindrical concave surfaces along the length of flat lens bar 304. There are prisms 306 arranged in "threes" as in FIG. 9A The central axes 308 of prisms 306 converge at point 310. At the right side the diverging rays 326 are shown. This surface is similar to the one shown in FIG. 2G. The rays diverge as shown in FIG. 1H.

FIG. 9C is a schematic view of a flat lens bar 304 having a series of convex lens sections 342. The ray pattern is described in connection with FIG. 1J.

FIG. 9D is a schematic view of a flat lens bar 304 having a multiple section inner surface 334, each section being different. As shown, one section is concave 336, one is flat 338, and the other is convex 340. This figure shows the lens bar 304 (as in FIG. 9A) with its surface comprising combined concave, flat and convex lineal surfaces. The ray pattern is similar to that described in connection with FIG. 2H, and as shown particularly in FIG. 1K.

FIG. 9E is a schematic view of a flat lens bar 304 having a multiple section inner surface 65 of the type shown in FIG. 1I. Lens bar 304 has a surface comprised of alternating wedge prisms 328, 330, 332. The ray pattern is shown and is as described in connection with FIG. 1I.

Figure 9F:
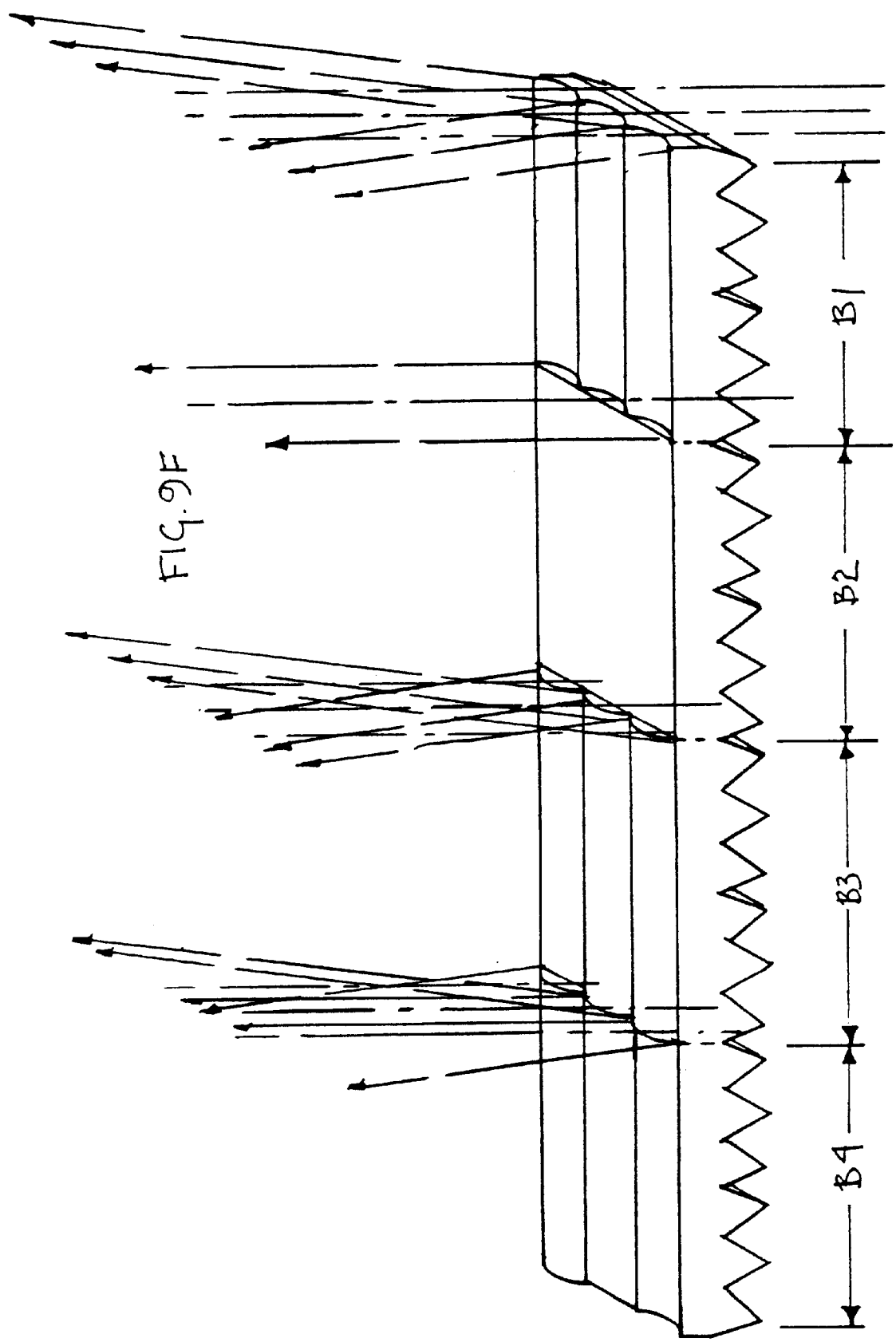
FIG. 9F is a schematic combination of flat lenses showing one section having multiple convex sections (two), a flat section, and a concave section.

FIG. 9F is a schematic view of a flat lens bar 304 having multiple sections of various types. The first section on the left side, B4, reflects the rays off the ring reflectors; the next adjacent section, B3, is similar to FIG. 9E and the ray description is as in FIG. 1J; the next adjacent section, B2, is flat on top similar to FIG. 9C and the ray description is as in FIG. 1I; and the right section, B1, is of concave sections similar to FIG. 9B and the ray description is as in FIG. 1H.

FIG. 10A is an isometric view of a lens formed of a series of ring reflectors 344 (first ring reflector), 346 (second ring reflector), 348 (third ring reflector) having cross-sections 350 (concave), 352 (flat), and 354 (convex), respectively. 350 has concave specular surfaces causing entry rays 356 to be reflected as convergent then divergent rays 358 (with respect to radius 364). Cross-section 352 has flat (in section) conical specular surfaces, causing rays 356 to be reflected as parallel rays 360 (with respect to radius 366). Cross-section 354 has convex specular surfaces causing rays 356 to be reflected as convergent rays 362 (with respect to radius 368).

The ring reflectors can be made to be only partial rings, in which case they extend for less than the full 360 degrees of a complete ring. As an example, a 180 degree partial ring 370 and a 90 degree partial ring 372 are also shown. Ray patterns are projected in degrees radially (and perpendicularly) away from beam axis 356 equal to the radial angle of the reflector rings 372 and 370.

FIG. 10B illustrates a variation of FIG. 10 in that the reflector ring 380 is in the form of a polyhedron (square) resulting in entry of beam 374 to be reflected as rays perpendicular to beam axis 378 and to the legs or segments 365, 367, 369 and 371 of the polyhedron from which they reflect.

Ray patterns 373, 375, 377, 379, 381 are reflected off reflector segments 365, 367, 369, 371, respectively. The ray patterns are reflected perpendicularly to central axis 378 and parallel to radial axes (since it is square these are really distances which are one-half the length of each leg) 383, 385, 387, 391, respectively.

FIG. 11A is a bottom view of a prism lens bar 304 as shown in FIG. 9A with the prisms being at varying angles to the longitudinal direction of the bar. Thus, in the example shown there are three sections of prisms, 382, 384 and 386. All of the prisms 306 in section 382 are parallel to one another and extend at a 45 degree angle to the longitudinal axis of the lens bar 304. All of the prisms 306 in section 384 are parallel to one another and extend at the opposite 45 degree angle with respect to the longitudinal axis of the lens bar 304. All of the prisms 306 in section 386 are parallel to one another and extend in the longitudinal direction of the lens bar 304.

FIG. 12 is a view of a generally cylindrical-like undulating wave guide lens 388 having a cylindrical form 389, with portions shown broken away to disclose details, the broken-away portions being shown in cross-hatching. Some sections of the wave guide lens are cutaway portions 390, 392 and 394. Such portions can be completely cut-away, or can be a surface which is clear or frosted for decorative patterns. As shown at the left side of the wave lens 388, the cylindrical form 389 has a concave portion 395 with radii 396 of the curve shown. Toward the middle, as shown in this example, the cylindrical form 389 has a convex portion 397 with radii 398 of the curve shown. The outer surface of the guide may contain different refractive surfaces, and can be, e.g., convex, concave or flat. For example see FIGS. 1H, 1J and 1K. The cutaways may be transversely concave or convex portions and may be "organic" (amoebae-shaped) or geometric in shape and patterning. In this embodiment the transmission means and the multi-prism wave lens are combined. And this may also be done in some of the previously described embodiments.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. In a lighting assembly having substantially collimated light as a source, the improvement comprising:
   a multi-faceted wave light modifying means for modifying the direction of substantially collimated light,
   said multi-faceted wave light modifying means being located for receiving substantially collimated light and redirecting it to pass through the section thereof which allows transmission of light and provide illumination and there being groups of prisms, in each group the axes passing through the apices of the prisms are not parallel, each individual prism within a group directs light in a different direction from other prisms in the group in a convergent or divergent manner.

2. The improvement defined in claim 1, wherein light source means which provides the substantially collimated light is disposed at one end of said transmission means, and further comprising light reflecting means disposed on the other side of the light direction modifying means from the light source.

3. The improvement defined in claim 2, wherein said light reflecting means is at the other end of said transmission means from said light source.

4. The improvement defined in claim 1, wherein there are a plurality of prisms on the surface of said light modifying means which receives the collimated light.

5. The improvement defined in claim 4, wherein said light modifying means is a reflector having a plurality of wedges on one surface thereof.

6. The improvement defined in claim 4, wherein the source of collimated light is disposed between the ends of the transmission means, and there are a plurality of light modifying means along the length thereof to provide lineal illumination.

7. The improvement defined in claim 6, further comprising a light beam reverser to provide illumination radially with respect to the light source so that the improvement provides unbroken lineal light.

8. The improvement defined in claim 7, further comprising a reflector disposed between said light beam reverser and said light direction modifying means.

9. The improvement defined in claim 4, wherein said light modifying means is a wave lens.

10. The improvement defined in claim 9, wherein said wave lens is arcuate in shape and curved from side to side.

11. The improvement defined in claim 9, wherein said wave lens is arcuate in shape and concave from side to side.

12. The improvement defined in claim 9, wherein said wave lens is a complex wave lens.

13. The improvement defined in claim 9 wherein the assembly is arranged so that at least some of the collimated light is provided by natural light.

14. The improvement defined in claim 9, wherein said wave lens is arcuate in shape and convex from side to side.

15. The improvement defined in claim 14, wherein said complex wave lens includes a first lens which is arcuate in shape and flat from side to side and a second lens which is cylindrical.

16. The improvement defined in claim 15, wherein said cylindrical lens is a positive lens.

17. The improvement defined in claim 15, wherein said cylindrical lens is a negative lens.

18. The improvement defined in claim 9 wherein the wave lens is disposed in a channel.

19. The improvement defined in claim 18, wherein there are a plurality of lenses and channels.

20. The improvement defined in claim 19, wherein the channels are parallel to one another.

21. The improvement defined in claim 20, further comprising a rectangular housing in which the channels are disposed.

22. The improvement defined in claim 20, further comprising a cylindrical housing in which the channels are disposed.

23. The improvement defined in claim 9, wherein the wave lens is formed of ring reflectors.

24. The improvement defined in claim 23, wherein the cross section of the ring reflectors is formed of flat surfaces.

25. The improvement defined in claim 23, wherein the cross section of the ring reflectors is formed of concave surfaces.

26. The improvement defined in claim 23, wherein the cross section of the ring reflectors is formed of convex surfaces.

27. The improvement defined in claim 23, wherein the ring reflectors are circular.

28. The improvement defined in claim 23, wherein the ring reflectors are square.

29. The improvement defined in claim 9 further comprising support means for holding the wave lens in place, said support means having grooves in which the wave lens is located.

30. The improvement defined in claim 9, wherein the wave lens is formed on a flat bar in groups of prisms formed into curves on one side thereof.

31. The improvement defined in claim 30, wherein the top of the lens bar is flat.

32. The improvement defined in claim 30, wherein the top of the lens bar is formed of multiple concave surfaces parallel therewith.

33. The improvement defined in claim 30, wherein the top of the lens bar is formed of multiple convex surfaces parallel therewith.

34. The improvement defined in claim 30, wherein the top of the lens bar is formed of different shaped surfaces.

35. The improvement defined in claim 34, wherein the top of the lens bar is formed of different angled flat surfaces.

36. The improvement defined in claim 34, wherein the top of the lens bar is formed of concave, convex, and flat surfaces.

37. The improvement defined in claim 9, wherein there are a plurality of wave lenses in said transmission means.

38. The improvement defined in claim 37 wherein the wave lenses and the transmission means are formed together of a solid rod.

39. The improvement defined in claim 37, wherein said transmission means is formed by said wave lenses which are continuous and in the form of a cylinder.

40. The improvement defined in claim 39, wherein the cylinder has a concave and convex outside surface.

41. The improvement defined in claim 40, wherein portions of the cylinder have light transmitting sections of different shape which allow light to pass directly out of said cylinder.

42. The improvement defined in claim 37, wherein there is a section of said transmission means which reflects light formed by reflective surfaces inside said transmission means.

43. The improvement defined in claim 4 wherein there are two sources of light and further comprising a color filter in the path of rays from each light source.

44. The improvement defined in claim 42, wherein there are two sources of light, one at each end.

45. The improvement defined in claim 42, wherein the reflection surfaces are inclined.

46. The improvement defined in claim 42, wherein at least one of the reflection surfaces are located at the end of the transmission means.

47. The improvement defined in claim 42, wherein the reflection surfaces are formed on the inside surface of said transmission means.

48. The improvement defined in claim 42, wherein there are a plurality of wave lenses which are formed continuously.

49. The improvement defined in claim 48, wherein the wave lenses are multi-concave.

50. The improvement defined in claim 42, wherein there are two sources of light, both in the middle of the transmission means.

51. The improvement defined in claim 50 wherein the collimated light has an axis, and the transmission means has a longitudinal axis, the transmission means axis and collimation axis being at an angle with respect to one another.

52. The improvement defined in claim 50, wherein the wave lenses are continuous.

53. The improvement defined in claim 52, further comprising beam reversers at the side facing the wave lenses to provide an unbroken lineal light.

54. The improvement defined in claim 53, further comprising a reflector disposed directly above the two sources of light.

55. In a lighting assembly having substantially collimated light as a source, the improvement comprising: a multiprism light modifying means for modifying the direction of substantially radially collimated light, said light modifying means surrounding the light source, and being formed in a wave, the waves being formed by groups of prisms having radii which meet in a quasi-point.

56. The improvement defined in claim 55, wherein the light modifying means is formed of a plurality of prisms defining lenses.

57. The improvement defined in claim 55, wherein the light modifying means is formed of a plurality of reflectors.

58. In a lighting assembly having light source means and collimating means for substantially collimating the light from the source, the improvement comprising:

(a) transmission means for transmitting the substantially collimated light to a point remote from said collimating means, and having an upper section which allows transmission of light therethrough and a lower section which reflects light; and (b) light direction modifying means in said transmission means and remote from said collimating means for receiving light from said collimating means and modifying the direction of the light to pass outside of said transmission means through said section which allows transmission of light, said light direction modifying means including a large plurality of prisms on the outer surface thereof.

59. The improvement defined in claim 58, further comprising light reflecting means at the other end of said transmission means from said light source for reflecting light to said prisms.

* * * * *